US012413720B2

(12) United States Patent
Zhao et al.

(10) Patent No.: US 12,413,720 B2
(45) Date of Patent: Sep. 9, 2025

(54) CROSS COMPONENT SAMPLE OFFSET FILTERING WITH INTERPOLATED FILTER TAPS

(71) Applicant: TENCENT AMERICA LLC, Palo Alto, CA (US)

(72) Inventors: Xin Zhao, San Jose, CA (US); Han Gao, San Diego, CA (US); Liang Zhao, Sunnyvale, CA (US); Jing Ye, San Jose, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 18/523,374

(22) Filed: Nov. 29, 2023

(65) Prior Publication Data

US 2025/0080730 A1    Mar. 6, 2025

Related U.S. Application Data

(60) Provisional application No. 63/536,012, filed on Aug. 31, 2023.

(51) Int. Cl.
*H04N 19/117*    (2014.01)
*H04N 19/132*    (2014.01)
(Continued)

(52) U.S. Cl.
CPC ......... *H04N 19/117* (2014.11); *H04N 19/132* (2014.11); *H04N 19/167* (2014.11);
(Continued)

(58) Field of Classification Search
CPC .... H04N 19/176; H04N 19/196; H04N 19/70; H04N 19/523; H04N 19/186;
(Continued)

(56) References Cited

U.S. PATENT DOCUMENTS

2015/0016533 A1\* 1/2015 Pang ................... H04N 19/523
                                                    375/240.16
2019/0166382 A1\* 5/2019 He ........................ H04N 19/59
(Continued)

FOREIGN PATENT DOCUMENTS

WO    WO 2022/251433 A1    12/2022

OTHER PUBLICATIONS

International Search Report and Written Opinion of PCT application PCT/U823/81874, dated March 13, 2024, 14 pages.

*Primary Examiner* — Neil R Mikeska
(74) *Attorney, Agent, or Firm* — Crowell & Moring LLP

(57) ABSTRACT

This disclosure generally describes a set of advanced video coding technologies, and is specifically related to cross-component sample offset (CCSO) filtering. For example, a CCSO filter having fractional CCSO filtering tap positions may be used to generate sample offsets from one color component of a reconstructed video. The sample offsets may then be applied to a second color component of the reconstructed video. The reconstructed samples of the first color component may first be interpolated by an interpolation filter in order to generate interpolated samples of the first color component at the fractional CCSO tap positions. The interpolated samples may be used as input to the CCSO filter for the generation of the sample offsets.

20 Claims, 17 Drawing Sheets

(51) Int. Cl.
*H04N 19/167* (2014.01)
*H04N 19/176* (2014.01)
*H04N 19/186* (2014.01)
*H04N 19/196* (2014.01)
*H04N 19/70* (2014.01)

(52) U.S. Cl.
CPC ......... *H04N 19/176* (2014.11); *H04N 19/186* (2014.11); *H04N 19/196* (2014.11); *H04N 19/70* (2014.11)

(58) Field of Classification Search
CPC .... H04N 19/167; H04N 19/82; H04N 19/132; H04N 19/117
See application file for complete search history.

(56) References Cited

U.S. PATENT DOCUMENTS

| | | | |
|---|---|---|---|
| 2021/0127110 A1* | 4/2021 | Filippov | H04N 19/176 |
| 2022/0232206 A1* | 7/2022 | Lee | H04N 19/593 |
| 2022/0272389 A1 | 8/2022 | Zhang et al. | |
| 2022/0295054 A1 | 9/2022 | Zhao et al. | |
| 2023/0224503 A1 | 7/2023 | Du et al. | |
| 2023/0396759 A1* | 12/2023 | Zhang | H04N 19/186 |

\* cited by examiner

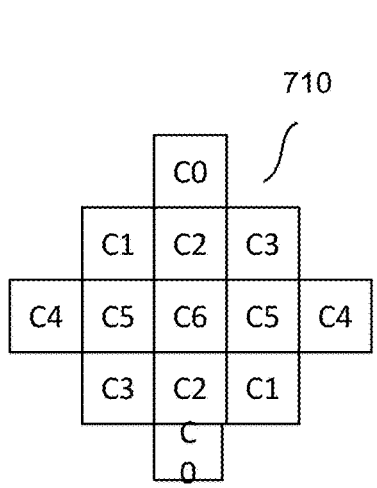
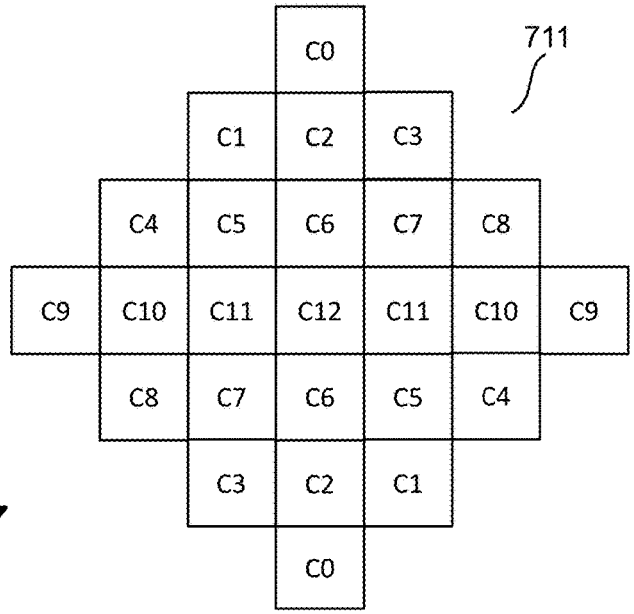
*FIG. 7*
*FIG. 8A*
*FIG. 8B*
*FIG. 8C*
*FIG. 8D*

FIG. 10A
FIG. 10B
FIG. 10C
FIG. 10D
FIG. 10E
FIG. 10F

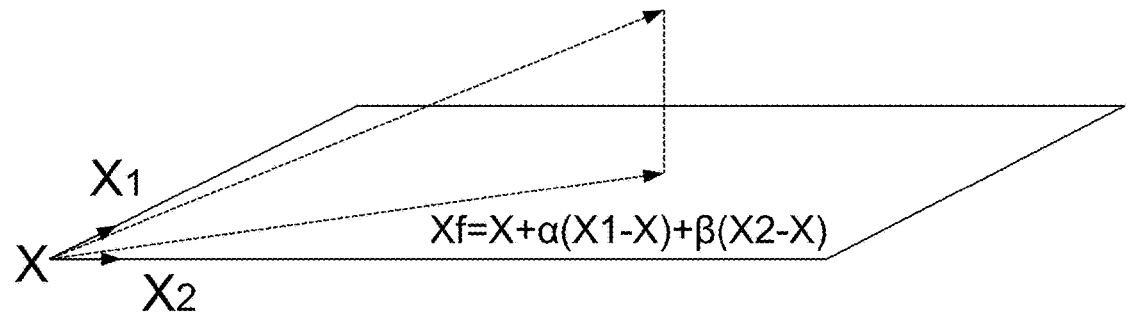
FIG. 17
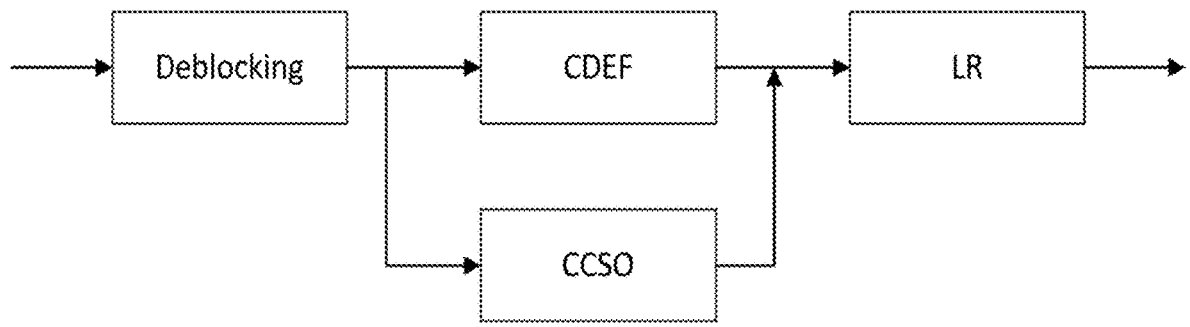
FIG. 18
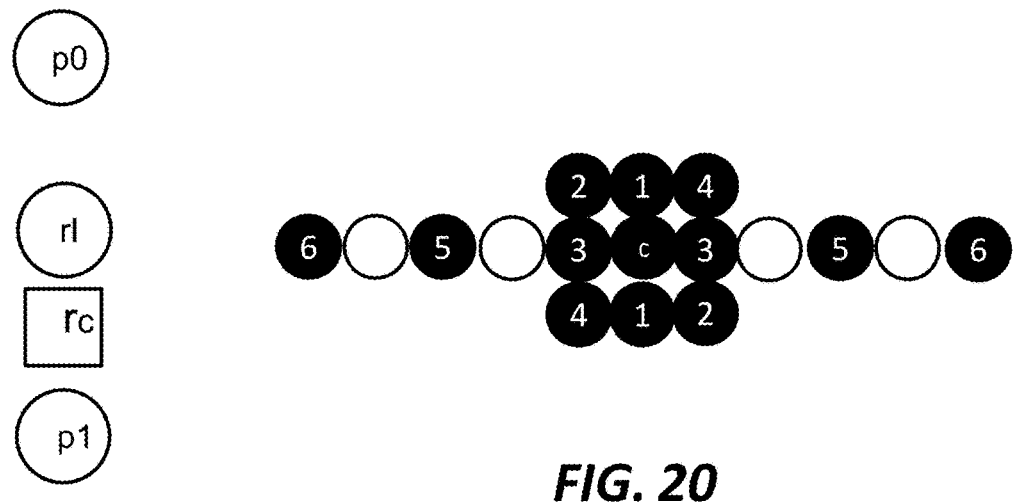
FIG. 19
FIG. 20

US 12,413,720 B2

CROSS COMPONENT SAMPLE OFFSET FILTERING WITH INTERPOLATED FILTER TAPS

INCORPORATION BY REFERENCE

This disclosure is based on and claims the benefit of priority to U.S. Provisional Application No. 63/536,012, entitled "CCSO WITH INTERPOLATED FILTER TAPS," filed on Aug. 31, 2023, which is herein incorporated by reference in its entirety.

TECHNICAL FIELD

This disclosure generally describes a set of advanced video coding technologies, and is specifically related to cross-component sample offset filtering.

BACKGROUND

Uncompressed digital video can include a series of pictures, and may specific bitrate requirements for storage, data processing, and for transmission bandwidth in streaming applications. One purpose of video coding and decoding can be the reduction of redundancy in the uncompressed input video signal, through various compression techniques.

SUMMARY

This disclosure generally describes a set of advanced video coding technologies, and is specifically related to cross-component sample offset (CCSO) filtering. For example, a CCSO filter having fractional CCSO filtering tap positions may be used to generate sample offsets from one color component of a reconstructed video. The sample offsets may then be applied to a second color component of the reconstructed video. The reconstructed samples of the first color component may first be interpolated by an interpolation filter in order to generate interpolated samples of the first color component at the fractional CCSO tap positions. The interpolated samples may be used as input to the CCSO filter for the generation of the sample offsets.

In some example implementations, a method is disclosed. The method may include reconstructing a video frame from a video bitstream to generate reconstructed samples of at least a first color component and a second color component of the video frame; receiving at least one syntax element from the video bitstream to determine a cross-component sample offset (CCSO) filter applicable to the reconstructed samples of a CCSO filtering unit in the first color component, the CCSO filter being characterized by a set of CCSO filtering tap positions relative to a center tap; in response to the CCSO filter including a CCSO filtering tap position at a fractional pixel location, determining an interpolation filter and applying the interpolation filter to the reconstructed samples of the CCSO filtering unit in the first color component to generate interpolated samples of the CCSO filtering unit in the first color component at the fractional pixel location; generating sample offsets each for sample positions in the CCSO filtering unit by processing the reconstructed samples and the interpolated samples of the CCSO filtering unit in the first color component using the CCSO filter; and applying the sample offsets to the reconstructed samples of the CCSO filtering unit in the second color component.

In the example implementations above, the at least one syntax element comprises an indication of the CCSO filtering tap position at the fractional pixel location. The interpolation filter is configured to perform a multi-tap interpolation. The interpolation filter, for example, may include a 2-tap, 4-tap, 6-tap, or 8-tap interpolation filter.

In any one of the example implementations above, a number of taps in the interpolation filter for the multi-tap interpolation depends on a relative location of the reconstructed samples in the CCSO filtering unit to a boundary of the CCSO filtering unit.

In any one of the example implementations above, the interpolation filter is configured to perform: the multi-tap interpolation in a horizontal direction only when the CCSO filter comprises fractional tap positions only in the horizontal direction; the multi-tap interpolation in a vertical direction only when the CCSO filter comprises fractional tap positions only in the vertical direction; or the multi-tap interpolation by interpolating in one of a vertical direction and a horizontal direction to generate intermediate interpolation samples followed by interpolating the intermediate interpolation samples in another of the vertical direction and the horizontal direction, when the CCSO filter comprises fractional tap positions in both the horizontal direction and the vertical direction.

In any one of the example implementations above, the indication of the CCSO filtering tap position at the fractional pixel location comprises a first signaling syntax element and a second signaling syntax element for indicating a CCSO fractional pixel precision and a phase in the CCSO fractional pixel precision, respectively, for determining the CCSO filtering tap position at the fractional pixel location.

In any one of the example implementations above, the first signaling syntax element comprises an index for indicating one of a set of predetermined CCSO fractional pixel precisions, the set of predetermined CCSO fractional pixel precisions comprise at least one of ½-pel precision, ¼-pel precision, ⅛-pel precision, ¹⁄₁₆-pel precision, ¹⁄₃₂ precision.

In any one of the example implementations above, the second signaling syntax element comprises a phase index among a group of predefined phases determined according to the CCSO fractional pixel precision indicated by the first signaling syntax element.

In any one of the example implementations above, the at least one syntax element further comprises a flag preceding the first signaling syntax element and the second signaling syntax element for indicating that the CCSO filter comprises by one or more fractional tap positions.

In any one of the example implementations above, the CCSO filter as indicated by the at least one syntax element is selected from a plurality of allowed CCSO filters, and the plurality of allowed CCSO filters do not overlap in tab directions.

In any one of the example implementations above, the interpolation filter is only applied to one or more selected color components. The one or more selected color components are predetermined. The one or more selected color components may consist of luma color component. The second color component comprises one of chroma components.

In any one of the example implementations above, the set of CCSO filtering tap positions are implicitly derived using neighboring samples of a current block.

In any one of the example implementations above, the at least one syntax element is configured to signal a selection from CCSO filters having fractional tap positions or CCSO filters having only integer tap positions using separate index spaces. Alternatively, the at least one syntax element is configured to signal a selection from CCSO filters having fractional tap positions or CCSO filters having only integer tap positions using a single index space In some implementations, a video encoding or decoding device is disclosed. The device may include circuitry configured to implement any of the methods above.

Aspects of the disclosure also provide non-transitory computer-readable mediums storing instructions which when executed by a computer for video decoding and/or encoding cause the computer to perform the methods for video decoding and/or encoding.

BRIEF DESCRIPTION OF THE DRAWINGS

Further features, the nature, and various advantages of the disclosed subject matter will be more apparent from the following detailed description and the accompanying drawings in which:

FIG. 7 shows exemplary adaptive loop filters according to embodiments of the disclosure.

FIGS. 8A-8D show examples of subsampled positions used for calculating gradients of a vertical direction, a horizontal direction, and two diagonal directions, respectively, according to embodiments of the disclosure.

FIGS. 10A-10F show exemplary adaptive loop filters with padding operations at respective virtual boundaries according to embodiments of the disclosure.

FIG. 17 shows an example of a subspace projection according to an embodiment of the disclosure.

FIG. 18 shows an example location of a Cross-Component Sample Offset CCSO filtering in a loop filter pipeline.

FIG. 19 shows an example of a filter support area in a CCSO filter according to an embodiment of the disclosure.

FIG. 20 shows an example implementation of 3-tap CCSO filter shapes according to an embodiment of the disclosure.

DETAILED DESCRIPTION OF EMBODIMENTS

Throughout the specification and claims, terms may have nuanced meanings suggested or implied in context beyond an explicitly stated meaning. The phrase "in one embodiment/implementation" or "in some embodiments/implementations" as used herein does not necessarily refer to the same embodiment/implementation and the phrase "in another embodiment/implementation" or "in other embodiments" as used herein does not necessarily refer to a different embodiment. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of context-dependent meanings. Typically, "or" if used to associate a list, such as A, B or C, is intended to mean A, B, and C, here used in the inclusive sense, as well as A, B or C, here used in the exclusive sense. In addition, the term "one or more", "at least one", "a", "an", or "the" as used herein, depending at least in part upon context, may be used in a singular sense or plural sense. In addition, the term "based on" or "determined by" may be understood as not necessarily intended to convey an exclusive set of factors and may, instead, allow for existence of additional factors not necessarily expressly described, again, depending at least in part on context.

Figure 1:
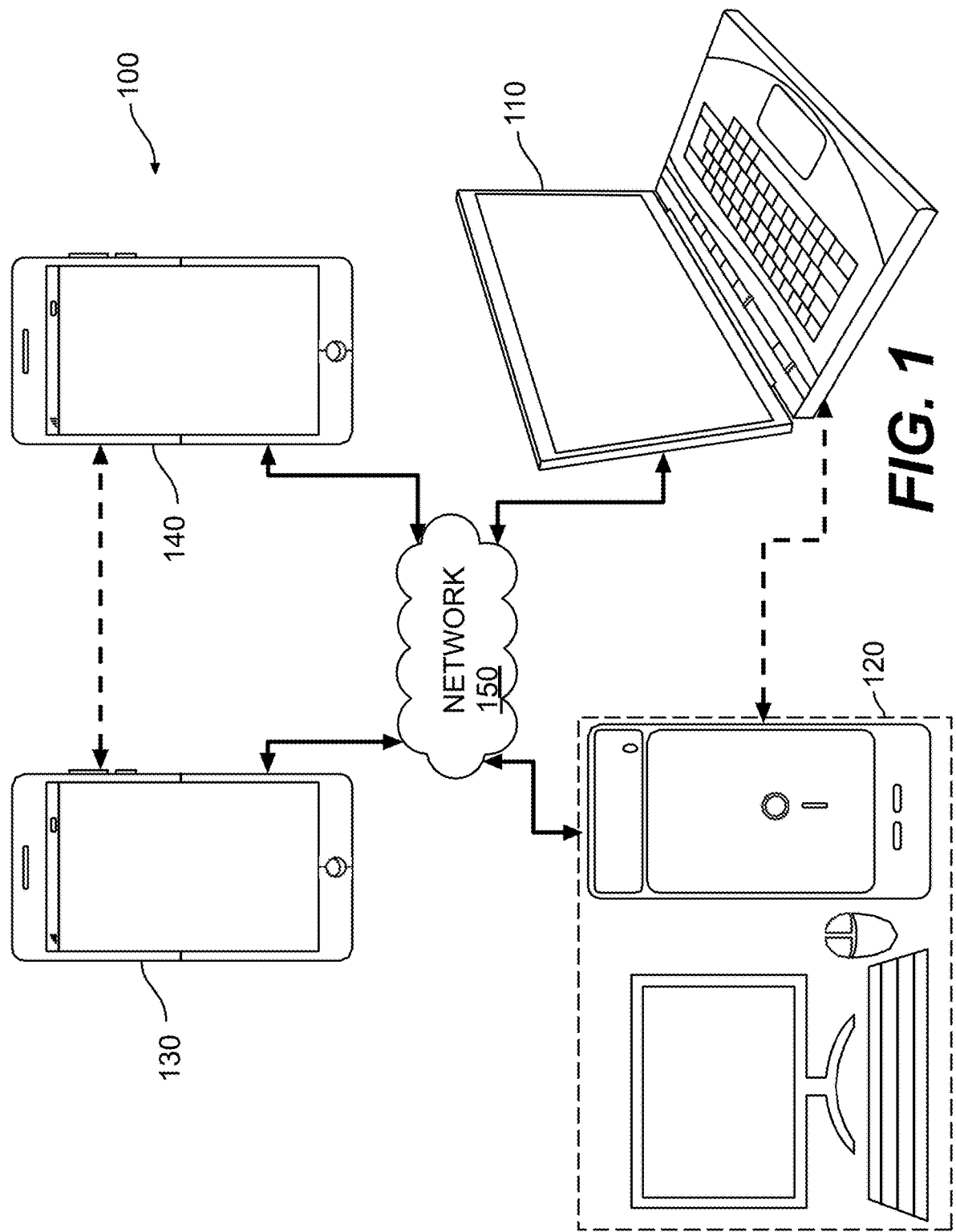
FIG. 1 shows a schematic illustration of a simplified block diagram of a communication system (100) in accordance with an example embodiment.

FIG. 1 illustrates a simplified block diagram of a communication system (100) according to an embodiment of the present disclosure. The communication system (100) includes a plurality of terminal devices, e.g., 110, 120, 130, and 140 that can communicate with each other, via, for example, a network (150). In the example of FIG. 1, the first pair of terminal devices (110) and (120) may perform unidirectional transmission of data. For example, the terminal device (110) may code video data in the form of one or more coded bitstreams (e.g., of a stream of video pictures that are captured by the terminal device (110)) for transmission via the network (150). The terminal device (120) may receive the coded video data from the network (150), decode the coded video data to recover the video pictures and display the video pictures according to the recovered video data. Unidirectional data transmission may be implemented in media serving applications and the like.

In another example, the second pair of terminal devices (130) and (140) may perform bidirectional transmission of coded video data, for example, during a videoconferencing application. For bidirectional transmission of data, in an example, each of the terminal devices (130) and (140) may code video data (e.g., of a stream of video pictures that are captured by the terminal device) for transmission to and may also receive coded video data from another of the terminal devices (130) and (140) to recover and display the video pictures.

In the example of FIG. 1, the terminal devices may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (150) represents any number or types of networks that convey coded video data among the terminal devices, including for example wireline (wired) and/or wireless communication networks. The communication network (150) may exchange data in circuit-switched, packet-switched, and/or other types of channels. Representative networks include telecommunications networks, local area networks, wide area networks and/or the Internet.

Figure 2:
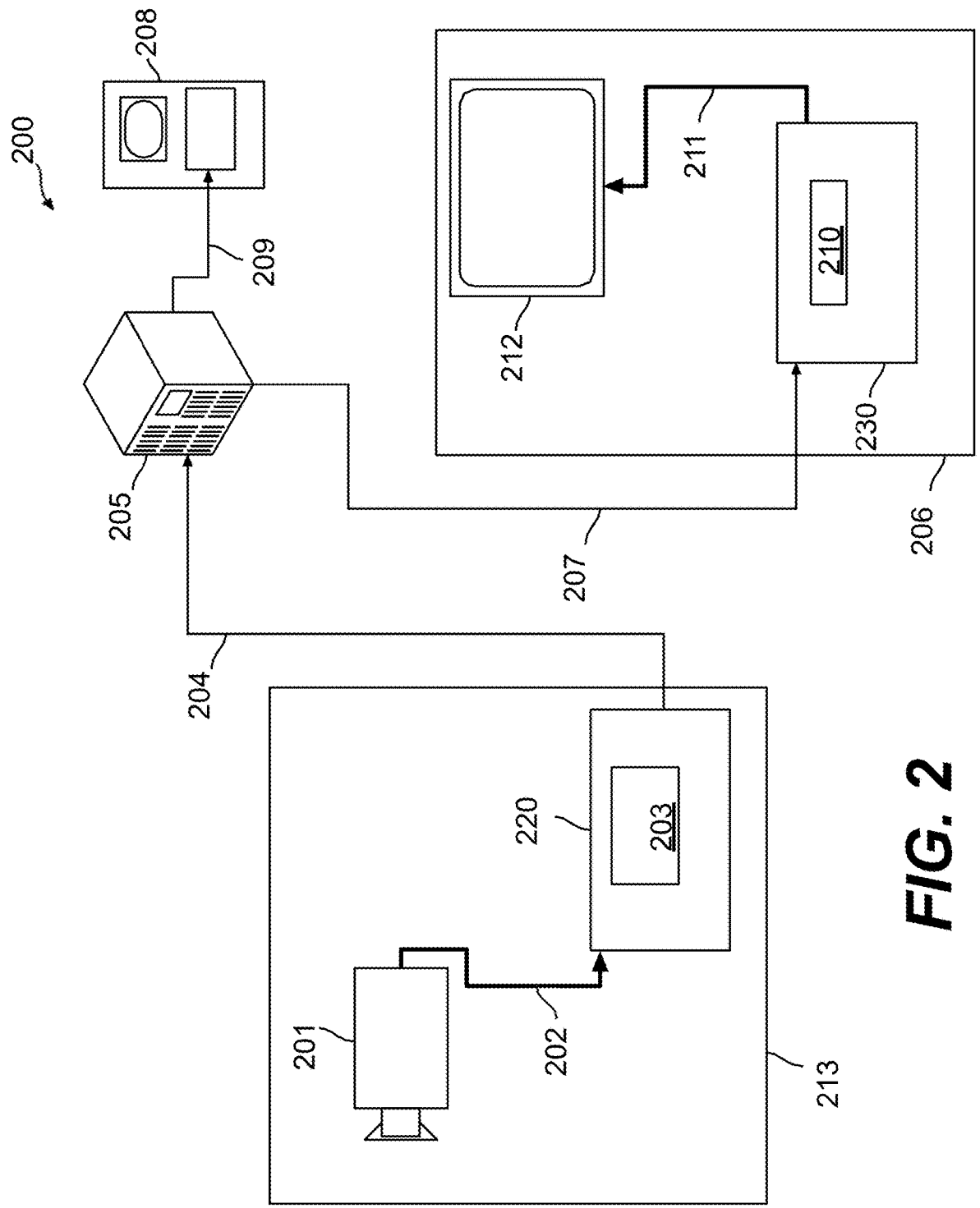
FIG. 2 shows a schematic illustration of a simplified block diagram of a communication system (200) in accordance with an example embodiment.

FIG. 2 illustrates, as an example for an application for the disclosed subject matter, a placement of a video encoder and a video decoder in a video streaming environment. The disclosed subject matter may be equally applicable to other video applications, including, for example, video conferencing, digital TV broadcasting, gaming, virtual reality, storage of compressed video on digital media including CD, DVD, memory stick and the like, and so on.

As shown in FIG. 2, a video streaming system may include a video capture subsystem (213) that can include a video source (201), e.g., a digital camera, for creating a stream of video pictures or images (202) that are uncompressed. In an example, the stream of video pictures (202) includes samples that are recorded by a digital camera of the video source 201. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize a lower data volume when compared to the stream of uncompressed video pictures (202), can be stored on a streaming server (205) for future use or directly to downstream video devices (not shown). One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that are uncompressed and that can be rendered on a display (212) (e.g., a display screen) or other rendering devices (not depicted).

Figure 3:
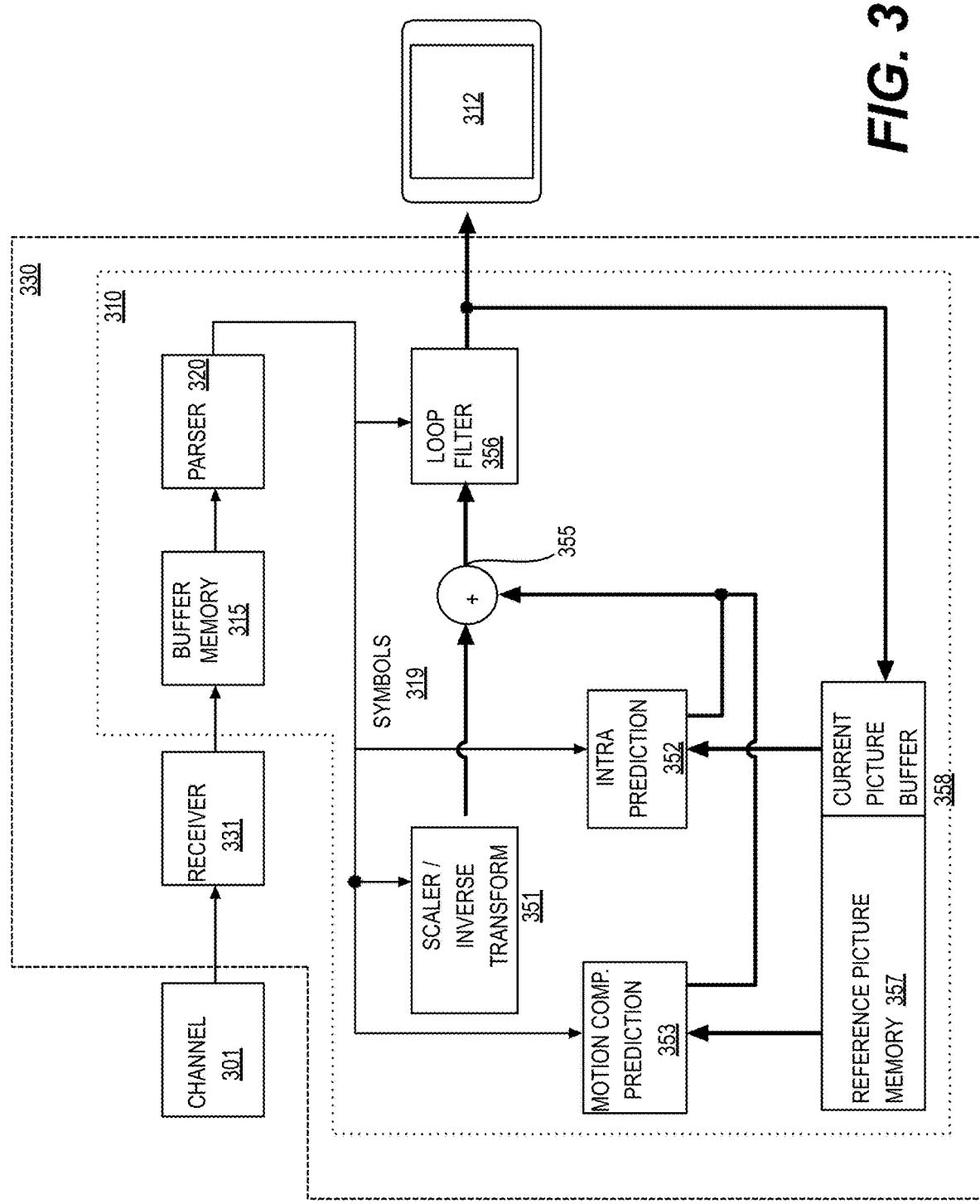
FIG. 3 shows a schematic illustration of a simplified block diagram of a video decoder in accordance with an example embodiment.

FIG. 3 shows a block diagram of a video decoder (310) of an electronic device (330) according to any embodiment of the present disclosure below. The electronic device (330) can include a receiver (331) (e.g., receiving circuitry). The video decoder (310) can be used in place of the video decoder (210) in the example of FIG. 2.

As shown, in FIG. 3, the receiver (331) may receive one or more coded video sequences from a channel (301). To combat network jitter and/or handle playback timing, a buffer memory (315) may be disposed in between the receiver (331) and an entropy decoder/parser (320) ("parser (320)" henceforth). The parser (320) may reconstruct symbols (321) from the coded video sequence. Categories of those symbols include information used to manage operation of the video decoder (310), and potentially information to control a rendering device such as display (312) (e.g., a display screen). The parser (320) may parse/entropy-decode the coded video sequence. The parser (320) may extract from the coded video sequence, a set of subgroup parameters for at least one of the subgroups of pixels in the video decoder. The subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients (e.g., Fourier transform coefficients), quantizer parameter values, motion vectors, and so forth. Reconstruction of the symbols (321) can involve multiple different processing or functional units. The units that are involved and how they are involved may be controlled by the subgroup control information that was parsed from the coded video sequence by the parser (320).

A first unit may include the scaler/inverse transform unit (351). The scaler/inverse transform unit (351) may receive a quantized transform coefficient as well as control information, including information indicating which type of inverse transform to use, block size, quantization factor/parameters, quantization scaling matrices, and the lie as symbol(s) (321) from the parser (320). The scaler/inverse transform unit (351) can output blocks comprising sample values that can be input into aggregator (355).

In some cases, the output samples of the scaler/inverse transform (351) can pertain to an intra coded block, i.e., a block that does not use predictive information from previously reconstructed pictures, but can use predictive information from previously reconstructed parts of the current picture. Such predictive information can be provided by an intra picture prediction unit (352). In some cases, the intra picture prediction unit (352) may generate a block of the same size and shape of the block under reconstruction using surrounding block information that is already reconstructed and stored in the current picture buffer (358). The current picture buffer (358) buffers, for example, partly reconstructed current picture and/or fully reconstructed current picture. The aggregator (355), in some implementations, may add, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) based on motion vector to fetch samples used for inter-picture prediction. After motion compensating the fetched reference samples in accordance with the symbols (321) pertaining to the block, these samples can be added by the aggregator (355) to the output of the scaler/inverse transform unit (351) (output of unit 351 may be referred to as the residual samples or residual signal) so as to generate output sample information.

The output samples of the aggregator (355) can be subject to various loop filtering techniques in the loop filter unit (356) including several types of loop filters. The output of the loop filter unit (356) can be a sample stream that can be output to the rendering device (312) as well as stored in the reference picture memory (357) for use in future inter-picture prediction.

Figure 4:
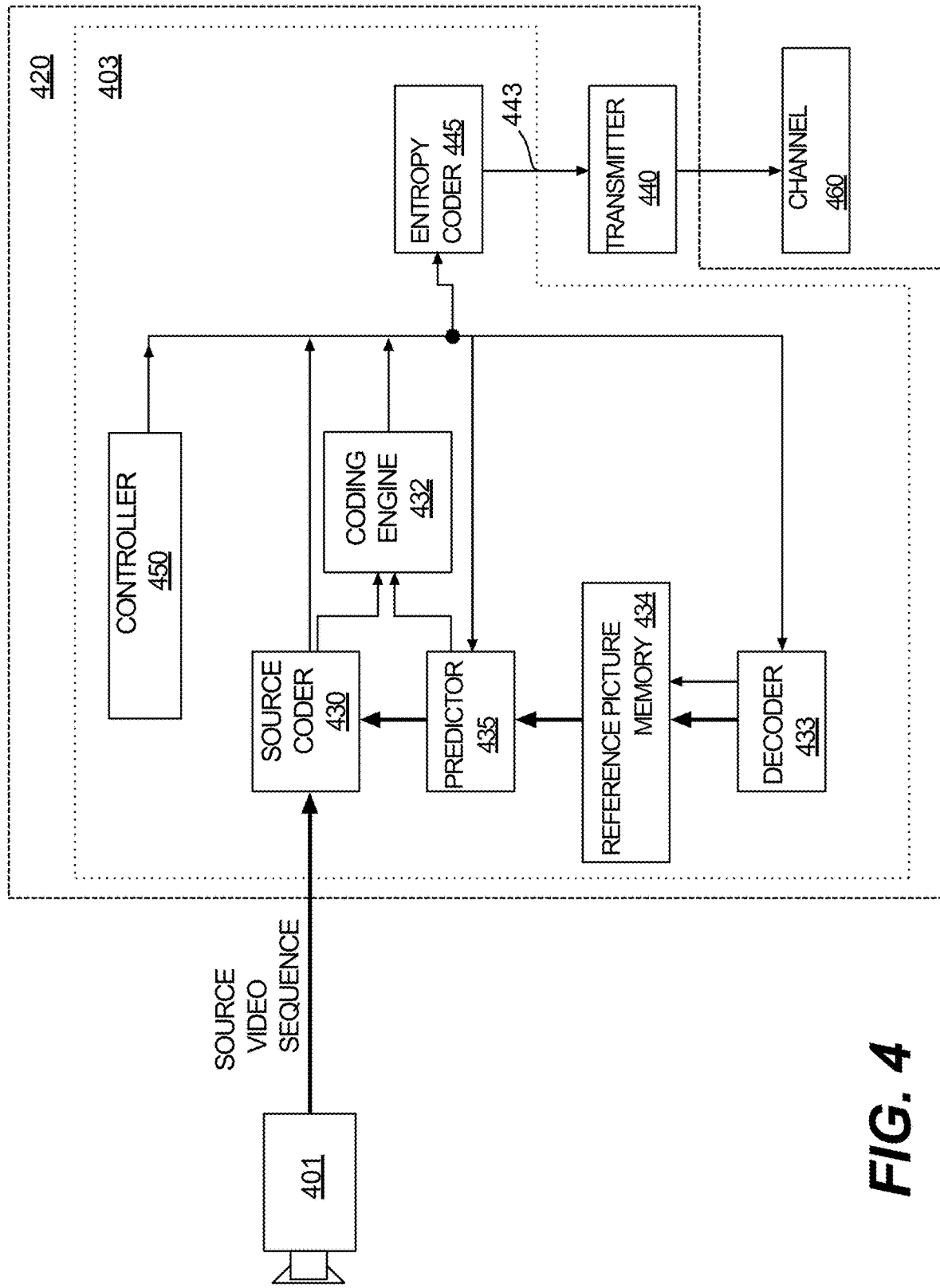
FIG. 4 shows a schematic illustration of a simplified block diagram of a video encoder in accordance with an example embodiment.

FIG. 4 shows a block diagram of a video encoder (403) according to an example embodiment of the present disclosure. The video encoder (403) may be included in an electronic device (420). The electronic device (420) may further include a transmitter (440) (e.g., transmitting circuitry). The video encoder (403) can be used in place of the video encoder (403) in the example of FIG. 4.

The video encoder (403) may receive video samples from a video source (401). According to some example embodiments, the video encoder (403) may code and compress the pictures of the source video sequence into a coded video sequence (443) in real time or under any other time constraints as required by the application. Enforcing appropriate coding speed constitutes one function of a controller (450). In some embodiments, the controller (450) may be functionally coupled to and control other functional units as described below. Parameters set by the controller (450) can include rate control related parameters (picture skip, quantizer, lambda value of rate-distortion optimization techniques, . . . ), picture size, group of pictures (GOP) layout, maximum motion vector search range, and the like.

In some example embodiments, the video encoder (403) may be configured to operate in a coding loop. The coding loop can include a source coder (430), and a (local) decoder (433) embedded in the video encoder (403). The decoder (433) reconstructs the symbols to create the sample data in a similar manner as a (remote) decoder would create even though the embedded decoder 433 process coded video steam by the source coder 430 without entropy coding (as any compression between symbols and coded video bitstream in entropy coding may be lossless in the video compression technologies considered in the disclosed subject matter). An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (430) may perform motion compensated predictive coding, which codes an input picture predictively with reference to one or more previously coded picture from the video sequence that were designated as "reference pictures."

The local video decoder (433) may decode coded video data of pictures that may be designated as reference pictures. The local video decoder (433) replicates decoding processes that may be performed by the video decoder on reference pictures and may cause reconstructed reference pictures to be stored in a reference picture cache (434). In this manner, the video encoder (403) may store copies of reconstructed reference pictures locally that have common content as the reconstructed reference pictures that will be obtained by a far-end (remote) video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures.

The controller (450) may manage coding operations of the source coder (430), including, for example, setting of parameters and subgroup parameters used for encoding the video data.

Output of all aforementioned functional units may be subjected to entropy coding in the entropy coder (445). The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types: an Intra Picture (I picture), a predictive picture (P picture), a bi-directionally predictive picture (B Picture), a multiple-predictive pictures. Source pictures commonly may be subdivided spatially into a plurality of sample coding blocks as described in further detail below.

Figure 5:
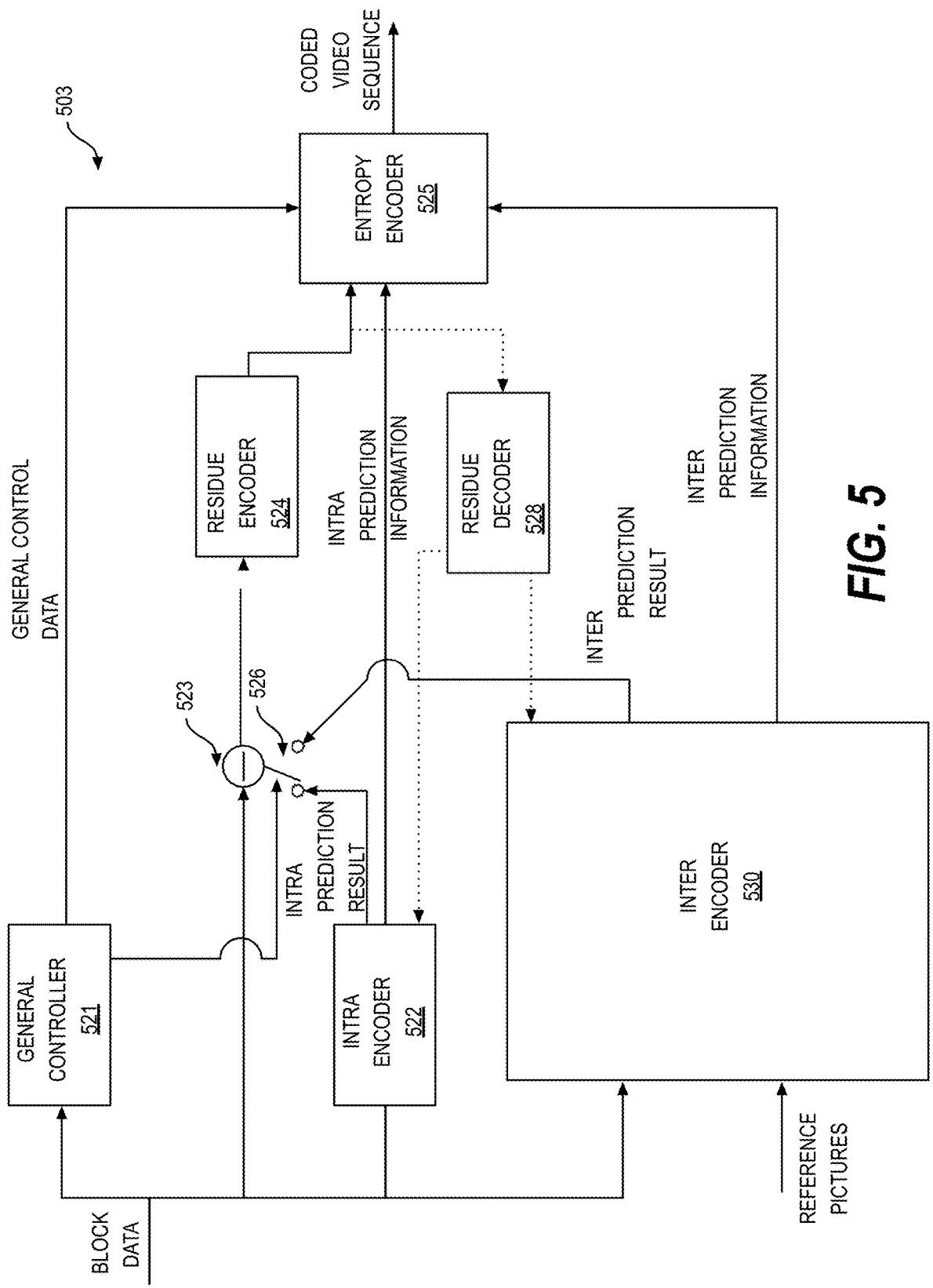
FIG. 5 shows a block diagram of a video encoder in accordance with another example embodiment.

FIG. 5 shows a diagram of a video encoder (503) according to another example embodiment of the disclosure. The video encoder (503) is configured to receive a processing block (e.g., a prediction block) of sample values within a current video picture in a sequence of video pictures, and encode the processing block into a coded picture that is part of a coded video sequence. The example video encoder (503) may be used in place of the video encoder (403) in the FIG. 4 example.

For example, the video encoder (503) receives a matrix of sample values for a processing block. The video encoder (503) then determines whether the processing block is best coded using intra mode, inter mode, or bi-prediction mode using, for example, rate-distortion optimization (RDO). In the example of FIG. 5, the video encoder (503) includes an inter encoder (530), an intra encoder (522), a residue calculator (523), a switch (526), a residue encoder (524), a general controller (521), and an entropy encoder (525) coupled together as shown in the example arrangement in FIG. 5.

The inter encoder (530) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique.

The intra encoder (522) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques).

The general controller (521) may be configured to determine general control data and control other components of the video encoder (503) based on the general control data to, for example, determine the prediction mode of the block and provides a control signal to the switch (526) based on the prediction mode.

The residue calculator (523) may be configured to calculate a difference (residue data) between the received block and prediction results for the block selected from the intra encoder (522) or the inter encoder (530). The residue encoder (524) may be configured to encode the residue data to generate transform coefficients. The transform coefficients are then subject to quantization processing to obtain quantized transform coefficients. In various example embodiments, the video encoder (503) also includes a residual decoder (528). The residual decoder (528) is configured to perform inverse-transform, and generate the decoded residue data. The entropy encoder (525) may be configured to format the bitstream to include the encoded block and perform entropy coding.

Figure 6:
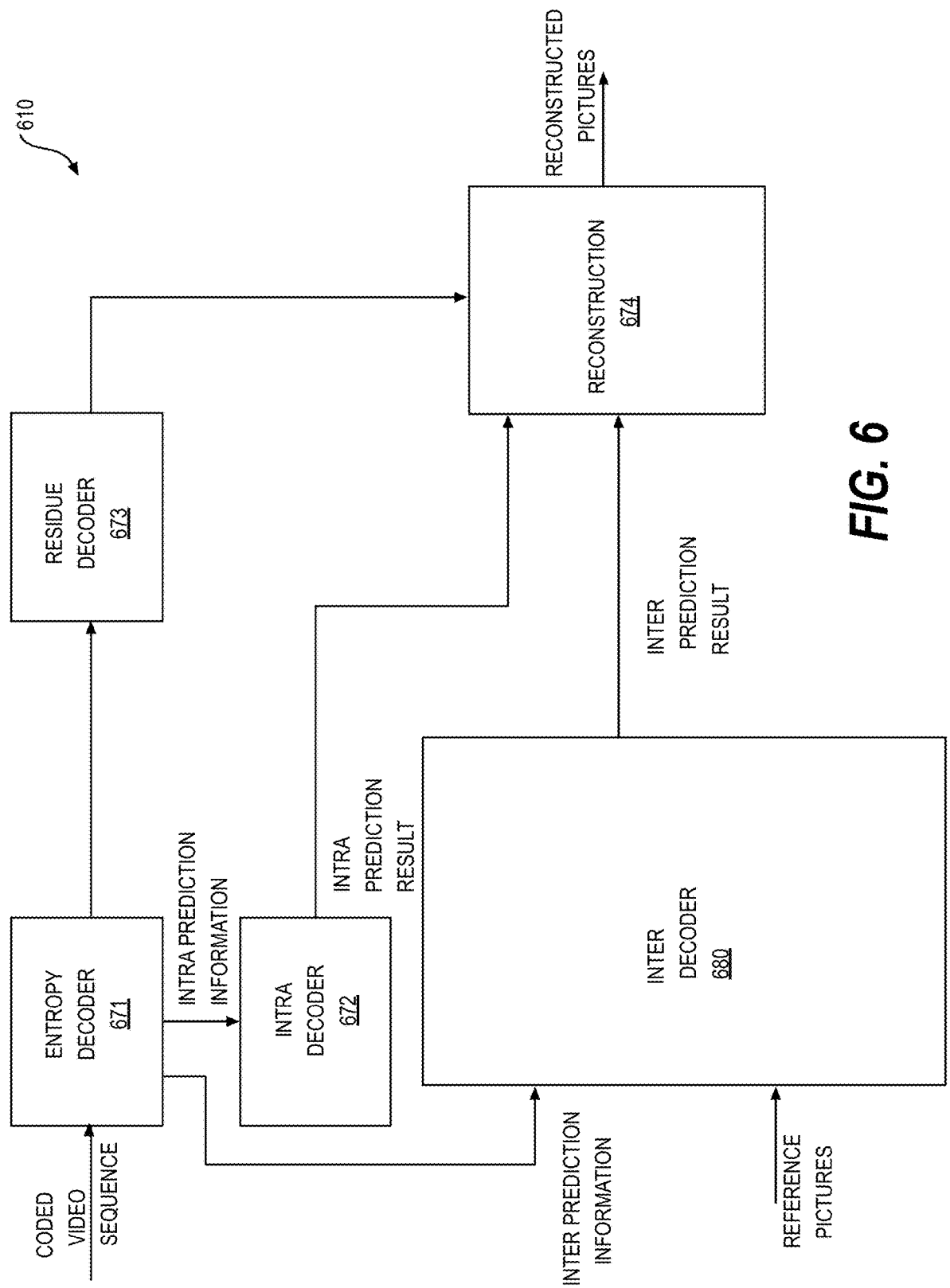
FIG. 6 shows a block diagram of a video decoder in accordance with another example embodiment.

FIG. 6 shows a diagram of an example video decoder (610) according to another embodiment of the disclosure. The video decoder (610) is configured to receive coded pictures that are part of a coded video sequence, and decode the coded pictures to generate reconstructed pictures. In an example, the video decoder (610) may be used in place of the video decoder (410) in the example of FIG. 4.

In the example of FIG. 6, the video decoder (610) includes an entropy decoder (671), an inter decoder (680), a residual decoder (673), a reconstruction module (674), and an intra decoder (672) coupled together as shown in the example arrangement of FIG. 6.

The entropy decoder (671) can be configured to reconstruct, from the coded picture, certain symbols that represent the syntax elements of which the coded picture is made up. The inter decoder (680) may be configured to receive the inter prediction information, and generate inter prediction results based on the inter prediction information. The intra decoder (672) may be configured to receive the intra prediction information, and generate prediction results based on the intra prediction information. The residual decoder (673) may be configured to perform inverse quantization to extract de-quantized transform coefficients, and process the de-quantized transform coefficients to convert the residual from the frequency domain to the spatial domain. The reconstruction module (674) may be configured to combine, in the spatial domain, the residual as output by the residual decoder (673) and the prediction results (as output by the inter or intra prediction modules as the case may be) to form a reconstructed block forming part of the reconstructed picture as part of the reconstructed video.

It is noted that the video encoders (203), (403), and (503), and the video decoders (210), (310), and (610) can be implemented using any suitable technique. In some example embodiments, the video encoders (203), (403), and (503), and the video decoders (210), (310), and (610) can be implemented using one or more integrated circuits. In another embodiment, the video encoders (203), (403), and (503), and the video decoders (210), (310), and (610) can be implemented using one or more processors that execute software instructions, and (810) can be implemented using one or more processors that execute software instructions.

In some example implementations, loop filters may be included in the encoders and decoders for reducing encoding artifacts and improving quality of the decoded pictures. For example, loop filters 356 may be included as part of the decoder 330 of FIG. 3. For another example, loop filters may be part of the embedded decoder unit 433 in the encoder 420 of FIG. 4. These filters are referred to as loop filters because they are included in the decoding loop for video blocks in decoders or encoders. Each loop filter may be associated with one or more filtering parameters. Such filtering parameters may be predefined or may be derived by the encoder during the encoding process. These filtering parameters (if derived by the encoder) or their indices (if predefined) may be included in the final bitstream in encoded form. A decoder may then parse these filtering parameters from the bitstream and perform loop filtering based on the parsed filtering parameters during decoding.

Various loop filters may be used for reducing coding artifact and improving decoded video quality in different aspects. Such loop filters may include but not limited to one or more deblocking filters, Adaptive Loop Filters (ALFs), Cross-Component Adaptive Loop Filters (CC-ALFs), Constrained Directional Enhancement Filters (CDEFs), Sample Adaptive Offset (SAO) filters, Cross-Component Sample Offset (CCSO) filters, and Local Sample Offset (LSO) filters. These filters may or may not be inter-dependent. They may be arranged in the decoding loop of the decoder or encoder in any suitable order that is compatible with their interdependence (if any). These various loop filters are described in more detail in the disclosure below.

An Adaptive Loop Filter (ALF) with block-based filter adaption can be applied by encoders/decoders to reduce artifacts. ALF is adaptive in the sense that the filtering coefficients/parameters or their indices are signaled in the bitstream and can be designed based on image content and distortion of the reconstructed picture. ALF may be applied to reduce distortion introduced by the encoding process and improve the reconstructed image quality.

For a luma component, one of a plurality of filters (e.g., 25 filters) may be selected for a luma block (e.g., a 4×4 luma block), for example, based on a direction and activity of local gradients. The filter coefficients of these filters may be derived by the encoder during encoding process and signaled to the decoder in the bitstream.

An ALF can have any suitable shape and size. Referring to the examples of FIG. 7. ALFs may have a diamond shape, such as a 5×5 diamond-shape for the ALF (710) and a 7×7 diamond-shape for the ALF (711). In the ALF (710), thirteen (13) elements can be used in the filtering process and form a diamond shape. Seven values (e.g., C0-C6) can be used and arranged in the illustrated example manner for the 13 elements. In the ALF (711), twenty-five (25) elements can be used in the filtering process and form a diamond shape. Thirteen (13) values (e.g., C0-C12) can be used for the 25 elements in the illustrated example manner.

Referring to FIG. 7, in some examples, ALF filters of one of the two diamond shapes (710)-(711) may be selected for processing a luma or chroma block. For example, the 5×5 diamond-shaped filter (710) can be applied for chroma components (e.g., chroma blocks, chroma CBs), and the 7×7 diamond-shaped filter (711) can be applied for a luma component (e.g., a luma block, a luma CB). Other suitable shape(s) and size(s) can be used in the ALF. For example, a 9×9 diamond-shaped filter can be used.

Filter coefficients at locations indicated by the values (e.g., C0-C6 in (710) or C0-C12 in (711)) can be non-zero. Further, when the ALF includes a clipping function, clipping values at the locations can be non-zero. The clipping function may be used to limit the upper bound of the filter value in the luma or chroma blocks.

In some implementations, a specific ALF to be applied to a particular block of a luma component may be based on a classification of the luma block. For block classification of a luma component, a 4×4 block (or luma block, luma CB)

can be categorized or classified as one of multiple (e.g., 25) classes, corresponding to, e.g., 25 different ALFs (e.g., 25 of 7 by 7 ALFs with different filter coefficients). A classification index C can be derived based on a directionality parameter D and a quantized value Â of an activity value A using Eq. (1).

$$C = 5D + \hat{A} \quad \text{Eq. (1)}$$

To calculate the directionality parameter D and the quantized value Â, gradients $g_v$, $g_h$, $g_{d1}$ and $g_{d2}$ of a vertical, a horizontal, and two diagonal directions (e.g., d1 and d2), respectively, can be calculated using 1-D Laplacian as follows.

$$g_v = \sum_{k=i-2}^{i+3} \sum_{l=j-2}^{j+3} V_{k,l}, \quad \text{Eq. (2)}$$

$$V_{k,l} = |2R(k, l) - R(k, l-1) - R(k, l+1)|$$

$$g_h = \sum_{k=i-2}^{i+3} \sum_{l=j-2}^{j+3} H_{k,l}, \quad \text{Eq. (3)}$$

$$H_{k,l} = |2R(k, l) - R(k-1, l) - R(k+1, 1, l)|$$

$$g_{d1} = \sum_{k=i-2}^{i+3} \sum_{l=j-3}^{j+3} D1_{k,l}, \quad \text{Eq. (4)}$$

$$D1_{k,l} = |2R(k, l) - R(k-1, l-1) - R(k+1, l+1)|$$

$$g_{d2} = \sum_{k=i-2}^{i+3} \sum_{j=j-2}^{j+3} D2_{k,l}, \quad \text{Eq. (5)}$$

$$D2_{k,l} = |2R(k, l) - R(k-1, l+1) - R(k+1, l-1)|$$

where indices i and j refer to coordinates of an upper left sample within the 4×4 block and R(k,l) indicates a reconstructed sample at a coordinate (k,l). The directions (e.g., d1 and d2) refer to 2 diagonal directions.

To reduce complexity of the block classification described above, a subsampled 1-D Laplacian calculation may be applied. FIGS. 8A-8D show examples of subsampled positions used for calculating the gradients $g_v$, $g_h$, $g_{d1}$, and $g_{d2}$ of the vertical (FIG. 8A), the horizontal (FIG. 8B), and the two diagonal directions d1 (FIG. 8C) and d2 (FIG. 8D), respectively. In FIG. 8A, labels 'V' show the subsampled positions to calculate the vertical gradient $g_v$. In FIG. 8B, labels 'H' show the subsampled positions to calculate the horizontal gradient $g_h$. In FIG. 8C, labels 'D1' show the subsampled positions to calculate the d1 diagonal gradient $g_{d1}$. In FIG. 8D, labels 'D2' show the subsampled positions to calculate the d2 diagonal gradient $g_{d2}$. FIGS. 8A and 8B show that the same subsampled positions can be used for gradient calculation of the different directions. In some other implementations, a different subsampling scheme can be used for all directions. In still some other implementations, different subsampling schemes can be used for different directions.

A maximum value $g_{h,v}^{max}$ and a minimum value $g_{h,v}^{min}$ of the gradients of horizontal and vertical directions $g_v$ and $g_h$ can be set as:

$$g_{h,v}^{max} = \max(g_h, g_v), \quad \text{Eq. (6)}$$

$$g_{h,v}^{min} = \min(g_h, g_v)$$

A maximum value $g_{d1,d2}^{max}$ and a minimum value $g_{d1,d2}^{min}$ of the gradients of two diagonal directions $g_{d1}$ and $g_{d2}$ can be set as:

$$g_{d1,d2}^{max} = \max(g_{d1}, g_{d2}), \quad \text{Eq. (7)}$$

$$g_{d1,d2}^{min} = \min(g_{d1}, g_{d2})$$

The directionality parameter D can be derived based on the above values and two thresholds $t_1$ and $t_2$ as below.

Step 1. If (1) $g_{h,v}^{max} \leq t_1 \cdot g_{d1,d2}^{min}$ and (2) $g_{d1,d2}^{min} \leq t_1 \cdot g_{d1,d2}^{min}$ are true, D is set to 0.

Step 2. If $g_{h,v}^{max}/g_{h,v}^{min} > g_{d1,d2}^{max}/g_{d1,d2}^{min}$, continue to Step 3; otherwise continue to Step 4.

Step 3. If $g_{h,v}^{max} > t_2 \cdot g_{h,v}^{min}$, D is set to 2; otherwise D is set to 1.

Step 4. If $g_{d1,d2}^{max} > t_2 \cdot g_{d1,d2}^{min}$, D is set to 4; otherwise D is set to 3.

Figure 8E:
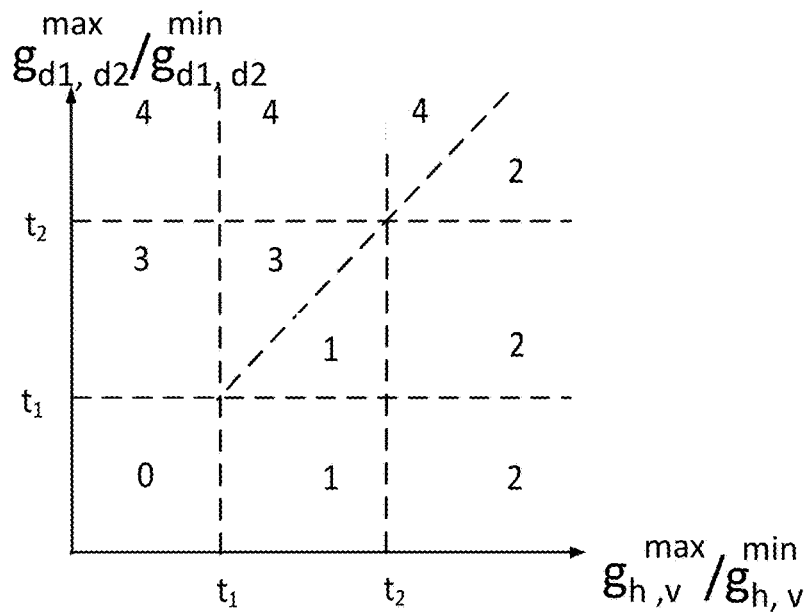
FIG. 8E shows an example manner to determine block directionality based on various gradients for use by an Adaptive Loop Filter (ALF).

In other words, the directionality parameter D is denoted by several discrete levels and are determined based on the gradient value spread for the luma block between horizontal and vertical directions, and between the two diagonal directions, as illustrated in FIG. 8E.

The activity value A can be calculated as:

$$A = \sum_{k=i-2}^{i+3} \sum_{l=j-2}^{j+3} (V_{k,l} + H_{k,l}) \quad \text{Eq. (8)}$$

The activity value A thus represents a composite measure of horizontal and vertical 1-D Laplacians. The activation value A for the luma block can be further quantized to a range of, for example, 0 to 4, inclusively, and the quantized value is denoted as Â.

For the luma component, the classification index C as calculated above may then be used to select one of the multiple classes (e.g., 25 classes) of diamond-shaped AFL filters. In some implementations, for chroma components in a picture, no block classification may be applied, and thus a single set of ALF coefficients can be applied for each chroma component. In such implementations, while there may be multiple ALF coefficient sets available for chroma component, the determination of an ALF coefficient may not be dependent on any classification of a chroma block.

Geometric transformations can be applied to filter coefficients and corresponding filter clipping values (also referred to as clipping values). Before filtering a block (e.g., a 4×4 luma block), geometric transformations such as rotation or diagonal and vertical flipping can be applied to the filter coefficients f(k,l) and the corresponding filter clipping values c(k,l), for example, depending on gradient values (e.g., $g_v$, $g_h$, $g_{d1}$, and/or $g_{d2}$) calculated for the block. The geometric transformations applied to the filter coefficients f(k,l) and the corresponding filter clipping values c(k,l) can be equivalent to applying the geometric transformations to samples in a region supported by the filter. The geometric transformations can make different blocks to which an ALF is applied more similar by aligning the respective directionality.

Three geometric transformation options, including a diagonal flip, a vertical flip, and a rotation can be performed as described by Eqs. (9)-(11), respectively.

$$f_D(k, l) = f(l, k), c_D(k, l) = c(l, k), \quad \text{Eq. (9)}$$

$$f_V(k, l) = f(k, K - l - 1), c_V(k, l) = c(k, K - l - 1) \quad \text{Eq. (10)}$$

$$f_R(k, l) = f(K - l - 1, k), c_R(k, l) = c(K - l - 1, k) \quad \text{Eq. (11)}$$

where K represents a size of the ALF or the filter, and 0≤k, l≤K−1 are coordinates of coefficients. For example, a location (0, 0) is at an upper left corner and a location (K−1, K−1) is at a lower right corner of the filter f or a clipping value matrix (or clipping matrix) c. The transformations can be applied to the filter coefficients f(k,l) and the clipping values c(k,l) depending on the gradient values calculated for the block. An example of a relationship between the transformation and the four gradients are summarized in Table 1.

TABLE 1

Mapping of the gradient calculated for a block and the transformation

| Gradient values | Transformation |
|---|---|
| $g_{d2} < g_{d1}$ and $g_h < g_v$ | No transformation |
| $g_{d2} < g_{d1}$ and $g_v < g_h$ | Diagonal flip |
| $g_{d1} < g_{d2}$ and $g_h < g_v$ | Vertical flip |
| $g_{d1} < g_{d2}$ and $g_v < g_h$ | Rotation |

In some embodiments, ALF filter parameters derived by the encoder may be signaled in an Adaptation Parameter Set (APS) for a picture. In the APS, one or more sets (e.g., up to 25 sets) of luma filter coefficients and clipping value indexes can be signaled. They may be indexed in the APS. In an example, a set of the one or more sets can include luma filter coefficients and one or more clipping value indexes. One or more sets (e.g., up to 8 sets) of chroma filter coefficients and clipping value indexes may be derived by the encoder and signaled. To reduce signaling overhead, filter coefficients of different classifications (e.g., having different classification indices) for luma components can be merged. In a slice header, indices of the APS's used for a current slice can be signaled. In another example, the signaling of ALF may be CTU based.

In an embodiment, a clipping value index (also referred to as clipping index) can be decoded from the APS. The clipping value index can be used to determine a corresponding clipping value, for example, based on a relationship between the clipping value index and the corresponding clipping value. The relationship can be pre-defined and stored in a decoder. In an example, the relationship is described by one or more tables, such as a table (e.g., used for a luma CB) of the clipping value index and the corresponding clipping value for a luma component, and a table (e.g., used for a chroma CB) of the clipping value index and the corresponding clipping value for a chroma component. The clipping value can be dependent on a bit depth B. The bit depth B may refer to an internal bit depth, a bit depth of reconstructed samples in a CB to be filtered, or the like. In some examples, a table of clipping values (e.g., for luma and/or for chroma) may be obtained using Eq. (12).

$$AlfClip = \{\text{round}(2^{B-\alpha*n}) \text{ for } n \in [0 \ldots N-1]\}, \quad \text{Eq. (12)}$$

where AlfClip is the clipping value, B is the bit depth (e.g., bitDepth), N (e.g., N=4) is a number of allowed clipping values, α is a pre-defined constant value. In an example, α is equal to 2.35. n is the clipping value index (also referred to as clipping index or clipIdx). Table 2 shows an example of a table obtained using Eq. (12) with N=4. The clipping index n can be 0, 1, 2, and 3 in Table 2 (up to N−1). Table 2 can be used for luma blocks or chroma blocks.

TABLE 2

AlfClip can depend on the bit depth B and clipIdx

| | clipIdx | | | |
|---|---|---|---|---|
| bitDepth | 0 | 1 | 2 | 3 |
| 8 | 255 | 64 | 16 | 4 |
| 9 | 511 | 108 | 23 | 5 |
| 10 | 1023 | 181 | 32 | 6 |
| 11 | 2047 | 304 | 45 | 7 |
| 12 | 4095 | 512 | 64 | 8 |
| 13 | 8191 | 861 | 91 | 10 |
| 14 | 16383 | 1448 | 128 | 11 |
| 15 | 32767 | 2435 | 181 | 13 |
| 16 | 65535 | 4096 | 256 | 16 |

In a slice header for a current slice, one or more APS indices (e.g., up to 7 APS indices) can be signaled to specify luma filter sets that can be used for the current slice. The filtering process can be controlled at one or more suitable levels, such as a picture level, a slice level, a CTB level, and/or the like. In an example embodiment, the filtering process can be further controlled at a CTB level. A flag can be signaled to indicate whether the ALF is applied to a luma CTB. The luma CTB can choose a filter set among a plurality of fixed filter sets (e.g., 16 fixed filter sets) and the filter set(s) (e.g., up to 25 filters derived by the encoder, as described above, and also referred to as signaled filter set(s)) that are signaled in the APS's. A filter set index can be signaled for the luma CTB to indicate the filter set (e.g., the filter set among the plurality of fixed filter sets and the signaled filter set(s)) to be applied. The plurality of fixed filter sets can be pre-defined and hard-coded in an encoder and a decoder, and can be referred to as pre-defined filter sets. The pre-defined filters coefficients thus need not be signaled.

For a chroma component, an APS index can be signaled in the slice header to indicate the chroma filter sets to be used for the current slice. At the CTB level, a filter set index can be signaled for each chroma CTB if there is more than one chroma filter set in the APS.

The filter coefficients can be quantized with a norm equal to 128. In order to decrease the multiplication complexity, a bitstream conformance can be applied so that the coefficient value of the non-central position can be in a range of −2⁷ to 2⁷−1, inclusive. In an example, the central position coefficient is not signaled in the bitstream and can be considered as equal to 128.

In some embodiments, the syntaxes and semantics of clipping index and clipping values are defined as follows:

alf_luma_clip_idx[sfIdx][j] can be used to specify the clipping index of the clipping value to use before multiplying by the j-th coefficient of the signaled luma filter indicated by sfIdx. A requirement of bitstream conformance can include that the values of alf_luma_clip_idx[sfIdx][j] with sfIdx=0 to alf_luma_num_filters_signalled_minus1 and j=0 to 11 shall be in the range of, for example, 0 to 3, inclusive.

The luma filter clipping values AlfClipL[adaptation_parameter_set_id] with elements AlfClipL[adaptation_parameter_set_id][filtIdx][j], with filtIdx=0 to NumAlfFilters−1 and j=0 to 11 can be derived as specified in Table 2 depending on bitDepth set equal to BitDepth Y and clipIdx set equal to alf_luma_clip_idx[alf_luma_coeff_delta_idx [filtIdx]][j].

Alf_chroma_clip_idx[altIdx][j] can be used to specify the clipping index of the clipping value to use before multiplying by the j-th coefficient of the alternative chroma filter with index altIdx. A requirement of bitstream conformance can include that the values of alf_chroma_clip_idx[altidx][j] with altIdx=0 to alf_chroma_num_alt_filters_minus1, j=0 to 5 shall be in the range of 0 to 3, inclusive.

The chroma filter clipping values AlfClipC[adaptation_parameter_set_id][altIdx] with elements AlfClipC[adaptation_parameter_set_id][altidx][j], with altIdx=0 to alf_chroma_num_alt_filters_minus1, j=0 to 5 can be derived as specified in Table 2 depending on bitDepth set equal to BitDepthC and clipIdx set equal to alf_chroma_clip_idx[altIdx][j].

In an embodiment, the filtering process can be described as below. At a decoder side, when the ALF is enabled for a CTB, a sample R(i,j) within a CU (or CB) of the CTB can be filtered, resulting in a filtered sample value R'(i,j) as shown below using Eq. (13). In an example, each sample in the CU is filtered.

$$R'(i, j) = R(i, j) + \left( \left( \sum_{k \neq 0} \sum_{l \neq 0} f(k, l) \times K(R(i+k, j+l) - R(i, j), c(k, l)) + 64 \right) \gg 7 \right) \quad \text{Eq. (13)}$$

where f(k,l) denotes the decoded filter coefficients, K(x,y) is a clipping function, and c(k,l) denotes the decoded clipping parameters (or clipping values). The variables k and l can vary between −L/2 and L/2 where L denotes a filter length (e.g., L=5 and 7, for the example diamond filters 710 and 711 of FIG. 7 for luma and chroma components, respectively). The clipping function K(x, y)=min (y, max(−y, x)) corresponds to a clipping function Clip3 (−y, y, x). By incorporating the clipping function K(x,y), the loop filtering method (e.g., ALF) becomes a non-linear process, and can be referred to a nonlinear ALF.

The selected clipping values can be coded in an "alf_data" syntax element as follows: a suitable encoding scheme (e.g., a Golomb encoding scheme) can be used to encode a clipping index corresponding to the selected clipping value such as shown in Table 2. The encoding scheme can be the same encoding scheme used for encoding the filter set index.

Figure 9A:
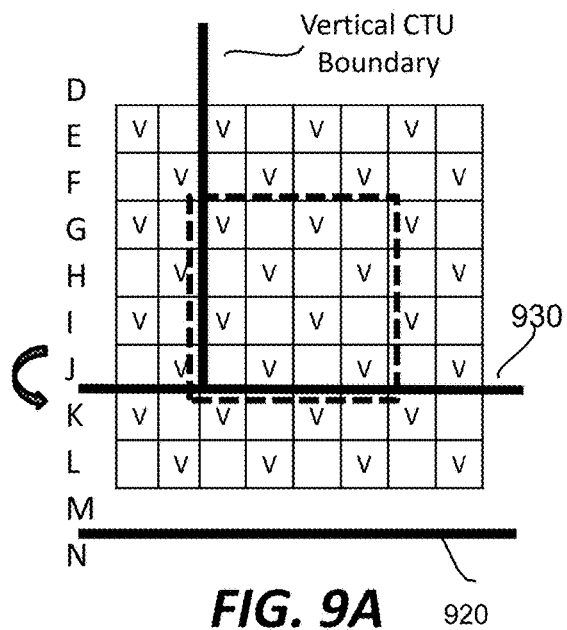
FIGS. 9A and 9B show modified block classifications at virtual boundaries according to example embodiments of the disclosure.

In an embodiment, a virtual boundary filtering process can be used to reduce a line buffer requirement of the ALF. Accordingly, modified block classification and filtering can be employed for samples near CTU boundaries (e.g., a horizontal CTU boundary). A virtual boundary (930) can be defined as a line by shifting a horizontal CTU boundary (920) by "$N_{samples}$" samples, as shown in FIG. 9A, where $N_{samples}$ can be a positive integer. In an example, $N_{samples}$ is equal to 4 for a luma component, and $N_{samples}$ is equal to 2 for a chroma component.

Figure 9B:
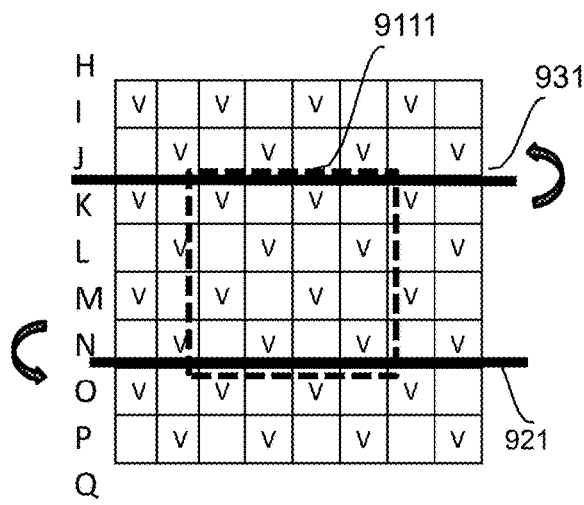

Referring to FIG. 9A, a modified block classification can be applied for a luma component. In an example, for the 1-D Laplacian gradient calculation of a 4×4 block (910) above the virtual boundary (930), only samples above the virtual boundary (930) are used. Similarly, referring to FIG. 9B, for a 1-D Laplacian gradient calculation of a 4×4 block (911) below a virtual boundary (931) that is shifted from a CTU boundary (921), only samples below the virtual boundary (931) are used. The quantization of an activity value A can be accordingly scaled by taking into account a reduced number of samples used in the 1D Laplacian gradient calculation.

Figures 10A, 10B, 10C, 10D, 10E, 10F:
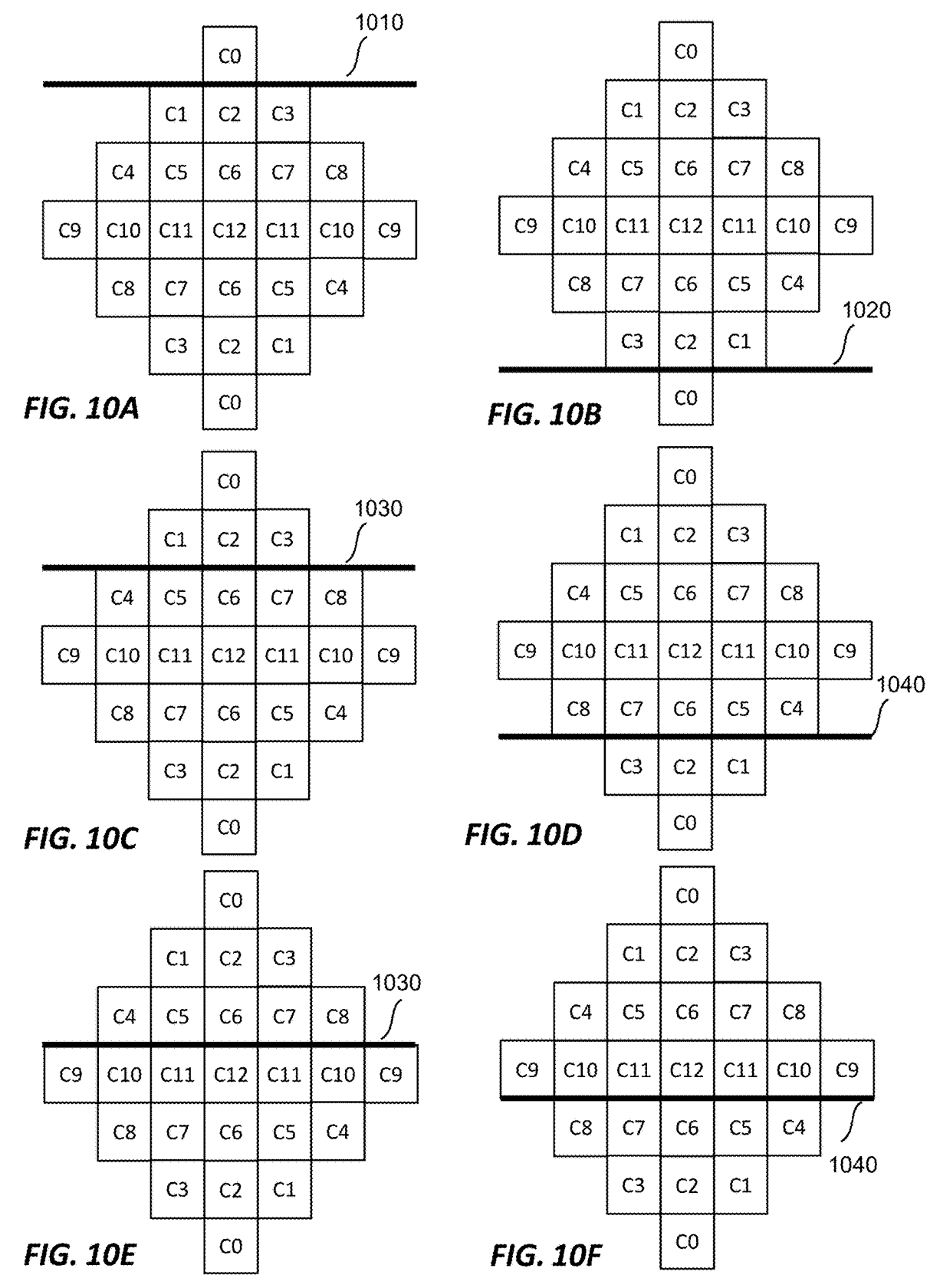

For a filtering processing, a symmetric padding operation at virtual boundaries can be used for both a luma component and a chroma component. FIGS. 10A-10F illustrate examples of such modified ALF filtering for a luma component at virtual boundaries. When a sample being filtered is located below a virtual boundary, neighboring samples that are located above the virtual boundary can be padded. When a sample being filtered is located above a virtual boundary, neighboring samples that are located below the virtual boundary can be padded. Referring to FIG. 10A, a neighboring sample C0 can be padded with a sample C2 that is located below a virtual boundary (1010). Referring to FIG. 10B, a neighboring sample C0 can be padded with a sample C2 that is located above a virtual boundary (1020). Referring to FIG. 10C, neighboring samples C1-C3 can be padded with samples C5-C7, respectively, that are located below a virtual boundary (1030). Sample C0 can be padded with sample C6. Referring to FIG. 10D, neighboring samples C1-C3 can be padded with samples C5-C7, respectively, that are located above a virtual boundary (1040). Sample C0 can be padded with sample C6. Referring to FIG. 10E, neighboring samples C4-C8 can be padded with samples C10, C11, C12. C11, and C10, respectively, that are located below a virtual boundary (1050). Samples C1-C3 can be padded with samples C11, C12, and C11. Sample C0 can be padded with sample C12. Referring to FIG. 10F, neighboring samples C4-C8 can be padded with samples C10, C11, C12, C11, and C10, respectively, that are located above a virtual boundary (1060). Samples C1-C3 can be padded with samples C11, C12, and C11. Sample C0 can be padded with sample C12.

In some examples, the above description can be suitably adapted when sample(s) and neighboring sample(s) are located to the left (or to the right) and to the right (or to the left) of a virtual boundary.

A largest coding unit (LCU)-aligned picture quadtree splitting can be used. In order to enhance coding efficiency, a coding unit synchronous picture quadtree-based adaptive loop filter can be used in video coding. In an example, a luma picture may be split into multiple multi-level quadtree partitions, and each partition boundary is aligned to boundaries of largest coding units (LCUs). Each partition can have a filtering process, and thus can be referred to as a filter unit or filtering unit (FU).

An example 2-pass encoding flow is described as follows. At a first pass, a quadtree split pattern and the best filter (or an optimal filer) of each FU can be decided. Filtering distortions can be estimated by a fast filtering distortion estimation (FFDE) during the decision process. According to the decided quadtree split pattern and the selected filters of the FUs (e.g., all FUs), a reconstructed picture can be filtered. At a second pass, a CU synchronous ALF on/off control can be performed. According to the ALF on/off results, the first filtered picture is partially recovered by the reconstructed picture.

Figure 11:
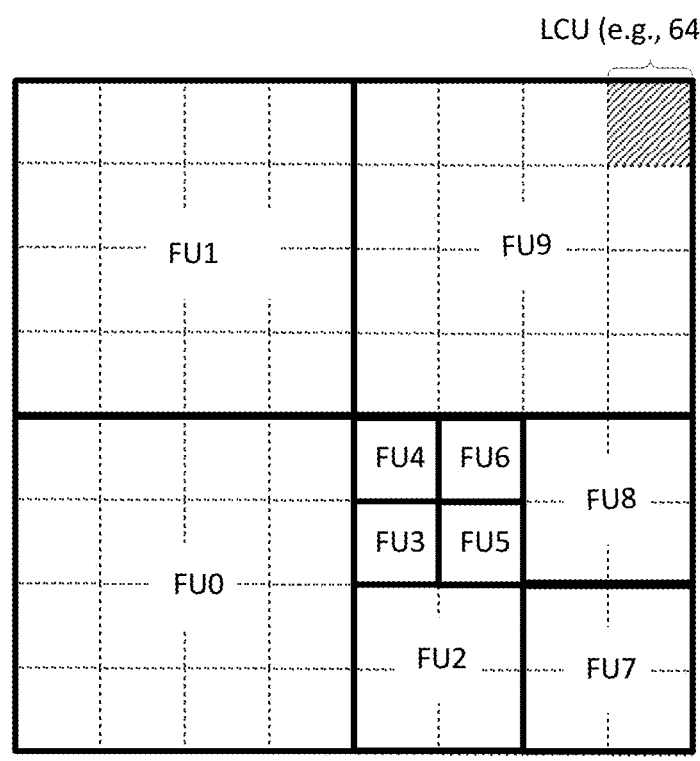
FIG. 11. shows an example of largest coding unit aligned picture quadtree splitting according to an embodiment of the disclosure.

A top-down splitting strategy can be adopted to divide a picture into multi-level quadtree partitions by using a rate-distortion criterion. Each partition can be referred to as a FU. The splitting process can align quadtree partitions with LCU boundaries, as shown in FIG. 11. FIG. 11 shows an example of LCU-aligned picture quadtree splitting according to an embodiment of the disclosure. In an example, an encoding order of FUs follows a z-scan order. For example, referring to FIG. 11, a picture is split into ten FUs (e.g., $FU_0$-$FU_9$, with a splitting depth of 2, with $FU_0$, $FU_1$, and FU being the first level FUs, $FU_S$, $FU_7$, and $FU_8$ being the second depth level FUs, and $FU_3$-$FU_6$ being the third depth level FUs) and the encoding order is from $FU_0$ to $FU_9$, e.g., $FU_0$, $FU_1$, $FU_2$, $FU_3$, $FU_4$, $FU_5$, $FU_6$, $FU_7$, $FU_8$, and $FU_9$.

Figure 12:
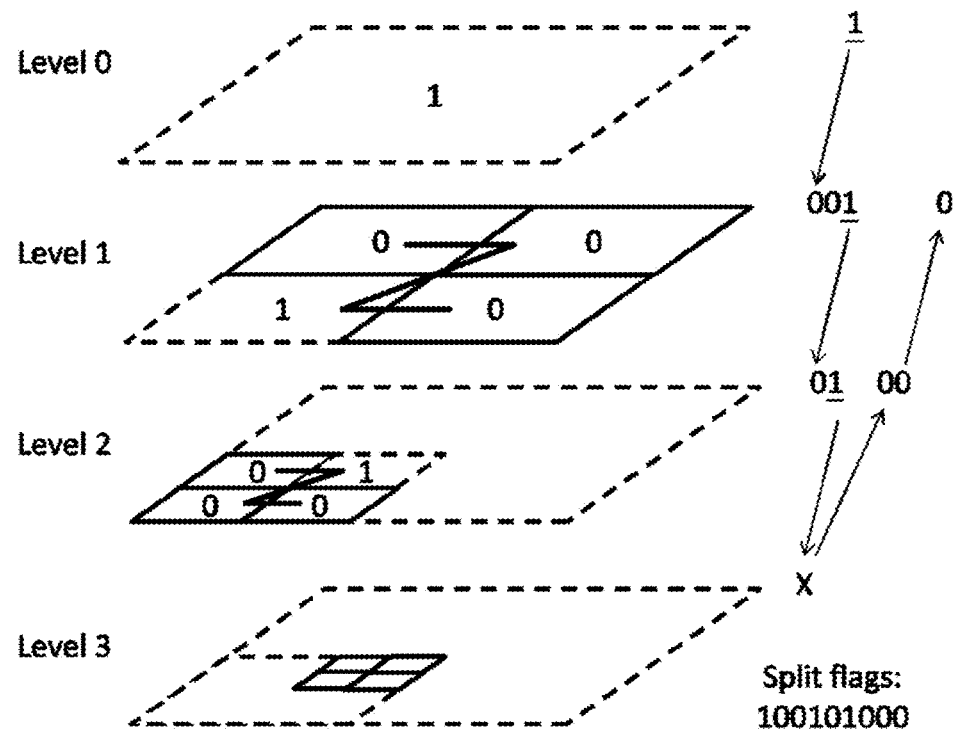
FIG. 12 shows a quadtree split pattern corresponding to FIG. 11 according to an example embodiment of the disclosure.

To indicate a picture quadtree split pattern, split flags ("1" representing a quadtree split, and "0" representing no quadtree split) can be encoded and transmitted in a z-scan order. FIG. 12 shows a quadtree split pattern corresponding to FIG. 11 according to an embodiment of the disclosure. As shown in an example in FIG. 12, quadtree split flags are encoded in a z scan order.

A filter of each FU can be selected from two filter sets based on a rate-distortion criterion. The first set can have ½-symmetric square-shaped and rhombus-shaped filters newly derived for a current FU. The second set can be from time-delayed filter buffers. The time-delayed filter buffers can store filters previously derived for FUs in prior pictures. The filter with the minimum rate-distortion cost of the two filter sets can be chosen for the current FU. Similarly, if the current FU is not the smallest FU and can be further split into four children FUs, the rate-distortion costs of the four children FUs can be calculated. By comparing the rate-distortion cost of the split and non-split cases recursively, the picture quadtree split pattern can be determined (in other words, whether the quadtree split of the current FU should stop).

In some examples, a maximum quadtree split level or depth may be limited to a predefined number. For example, the maximum quadtree split level or depth may be 2, and thus a maximum number of FUs may be 16 (or 4 to the power of maximum number of depth). During the quadtree split decision, correlation values for deriving Wiener coefficients of the 16 FUs at the bottom quadtree level (smallest FUs) can be reused. The remaining FUs can derive the Wiener filters of the remaining FUs from the correlations of the 16 FUs at the bottom quadtree level. Therefore, in an example, there is only one frame buffer access for deriving the filter coefficients of all FUs.

After the quadtree split pattern is determined, to further reduce the filtering distortion, the CU synchronous ALF on/off control can be performed. By comparing the filtering distortion and non-filtering distortion, a leaf CU can explicitly switch ALF on/off in a corresponding local region. The coding efficiency may be further improved by redesigning filter coefficients according to the ALF on/off results. In an example, the redesigning process needs additional frame buffer accesses. Thus, in some examples, such as a coding unit synchronous picture quadtree-based adaptive loop filter (CS-PQALF) encoder design, no redesign process is needed after the CU synchronous ALF on/off decision in order to minimize the number of frame buffer accesses.

A cross-component filtering process can apply cross-component filters, such as cross-component adaptive loop filters (CC-ALFs). The cross-component filter can use luma sample values of a luma component (e.g., a luma CB) to refine a chroma component (e.g., a chroma CB corresponding to the luma CB). In an example, the luma CB and the chroma CB are included in a CU.

Figure 13:
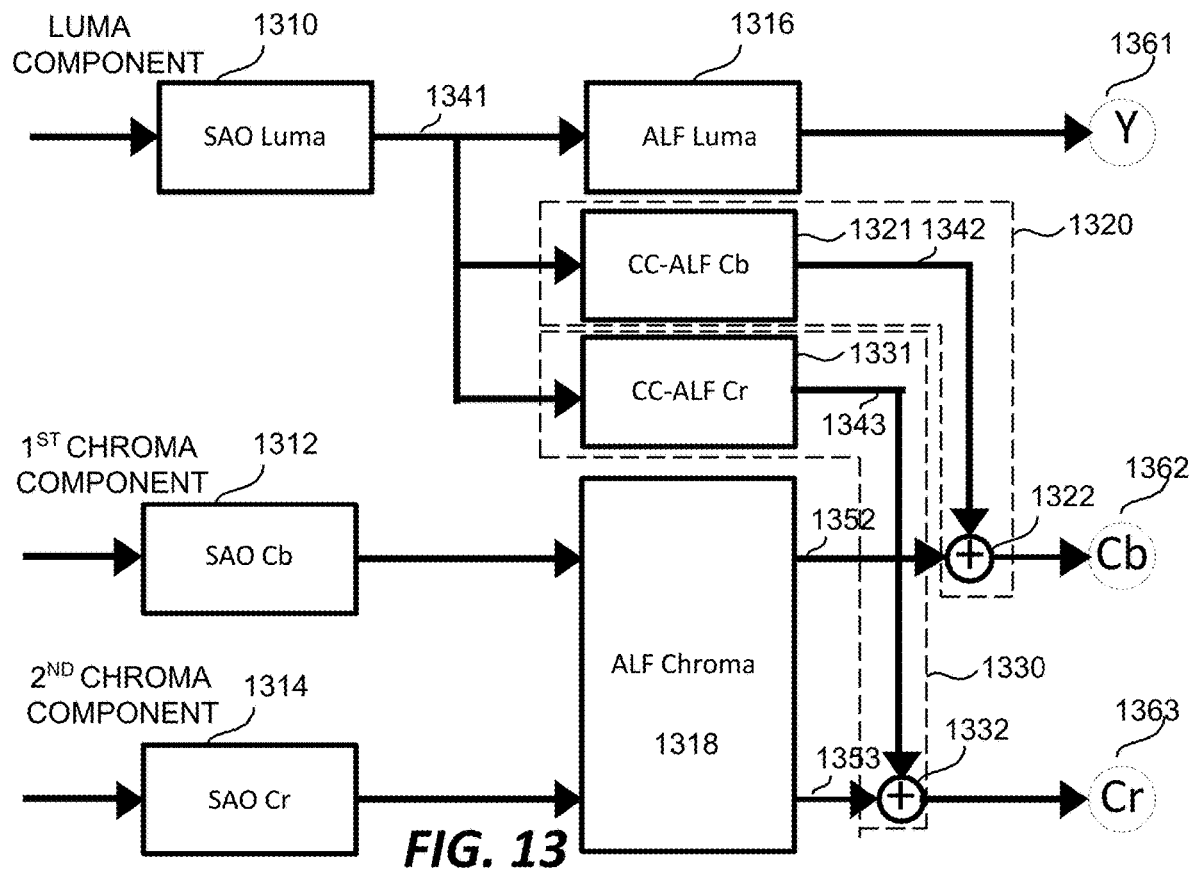
FIG. 13 shows cross-component filters used to generate chroma components according to an example embodiment of the disclosure.

FIG. 13 shows cross-component filters (e.g., CC-ALFs) used to generate chroma components according to an example embodiment of the disclosure. For example, FIG. 13 shows filtering processes for a first chroma component (e.g., a first chroma CB), a second chroma component (e.g., a second chroma CB), and a luma component (e.g., a luma CB). The luma component can be filtered by a sample adaptive offset (SAO) filter (1310) to generate a SAO filtered luma component (1341). The SAO filtered luma component (1341) can be further filtered by an ALF luma filter (1316) to become a filtered luma CB (1361) (e.g., 'Y').

The first chroma component can be filtered by a SAO filter (1312) and an ALF chroma filter (1318) to generate a first intermediate component (1352). Further, the SAO filtered luma component (1341) can be filtered by a cross-component filter (e.g., CC-ALF) (1321) for the first chroma component to generate a second intermediate component (1342). Subsequently, a filtered first chroma component (1362) (e.g., 'Cb') can be generated based on at least one of the second intermediate component (1342) and the first intermediate component (1352). In an example, the filtered first chroma component (1362) (e.g., 'Cb') can be generated by combining the second intermediate component (1342) and the first intermediate component (1352) with an adder (1322). The example cross-component adaptive loop filtering process for the first chroma component thus can include a step performed by the CC-ALF (1321) and a step performed by, for example, the adder (1322).

The above description can be adapted to the second chroma component. The second chroma component can be filtered by a SAO filter (1314) and the ALF chroma filter (1318) to generate a third intermediate component (1353). Further, the SAO filtered luma component (1341) can be filtered by a cross-component filter (e.g., a CC-ALF) (1331) for the second chroma component to generate a fourth intermediate component (1343). Subsequently, a filtered second chroma component (1363) (e.g., 'Cr') can be generated based on at least one of the fourth intermediate component (1343) and the third intermediate component (1353). In an example, the filtered second chroma component (1363) (e.g., 'Cr') can be generated by combining the fourth intermediate component (1343) and the third intermediate component (1353) with an adder (1332). In an example, the cross-component adaptive loop filtering process for the second chroma component thus can include a step performed by the CC-ALF (1331) and a step performed by, for example, the adder (1332).

A cross-component filter (e.g., the CC-ALF (1321), the CC-ALF (1331)) can operate by applying a linear filter having any suitable filter shape to the luma component (or a luma channel) to refine each chroma component (e.g., the first chroma component, the second chroma component). The CC-ALF utilize correlation across color components to reduce coding distortion in one color component based on samples from another color component.

Figure 14:
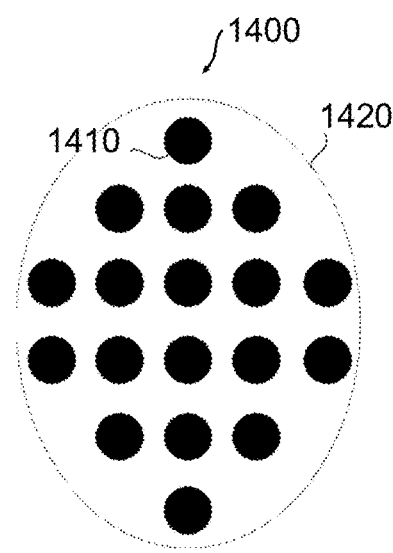
FIG. 14 shows an example of a cross-component ALF filter according to an embodiment of the disclosure.

FIG. 14 shows an example of a CC-ALF filter (1400) according to an embodiment of the disclosure. The filter (1400) can include non-zero filter coefficients and zero filter coefficients. The filter (1400) has a diamond shape (1420) formed by filter coefficients (1410) (indicated by circles having black fill). In an example, the non-zero filter coefficients in the filter (1400) are included in the filter coefficients (1410), and filter coefficients not included in the filter coefficients (1410) are zero. Thus, the non-zero filter coefficients in the filter (1400) are included in the diamond shape (1420), and the filter coefficients not included in the diamond shape (1420) are zero. In an example, a number of the filter coefficients of the filter (1400) is equal to a number of the filter coefficients (1410), which is 18 in the example shown in FIG. 14.

The CC-ALF can include any suitable filter coefficients (also referred to as the CC-ALF filter coefficients). Referring back to FIG. 13, the CC-ALF (1321) and the CC-ALF (1331) can have a same filter shape, such as the diamond shape (1420) shown in FIG. 14, and a same number of filter coefficients. In an example, values of the filter coefficients in the CC-ALF (1321) are different from values of the filter coefficients in the CC-ALF (1331).

In general, filter coefficients (e.g., non-zero filter coefficients, as derived by the encoder) in a CC-ALF can be transmitted, for example, in the APS. In an example, the filter coefficients can be scaled by a factor (e.g., $2^{10}$) and can be rounded for a fixed-point representation. Application of a CC-ALF can be controlled on a variable block size and signaled by a context-coded flag (e.g., a CC-ALF enabling flag) received for each block of samples. The context-coded flag, such as the CC-ALF enabling flag, can be signaled at any suitable level, such as a block level. The block size along with the CC-ALF enabling flag can be received at a slice-level for each chroma component. In some examples, block sizes (in chroma samples) 16×16, 32×32, and 64×64 can be supported.

In an example, the syntax changes of CC-ALF are described below in Table 3.

alf_ctb_cross_component_cr_idc[xCtb>>CtbLog2Size Y][yCtb>>CtbLog2Size Y] equal to 0 can indicate that the cross component Cr filter is not applied to block of Cr color component samples at the luma location (xCtb, yCtb).

alf_ctb_cross_component_cr_idc[xCtb>>CtbLog2Size Y][yCtb>>CtbLog2Size Y] not equal to 0 can indicate that the alf_ctb_cross_component_cr_idc[xCtb>>CtbLog2Size Y][yCtb>>CtbLog2Size Y]-th cross component Cr filter is applied to the block of Cr color component samples at the luma location (xCtb, yCtb).

Figure 15:
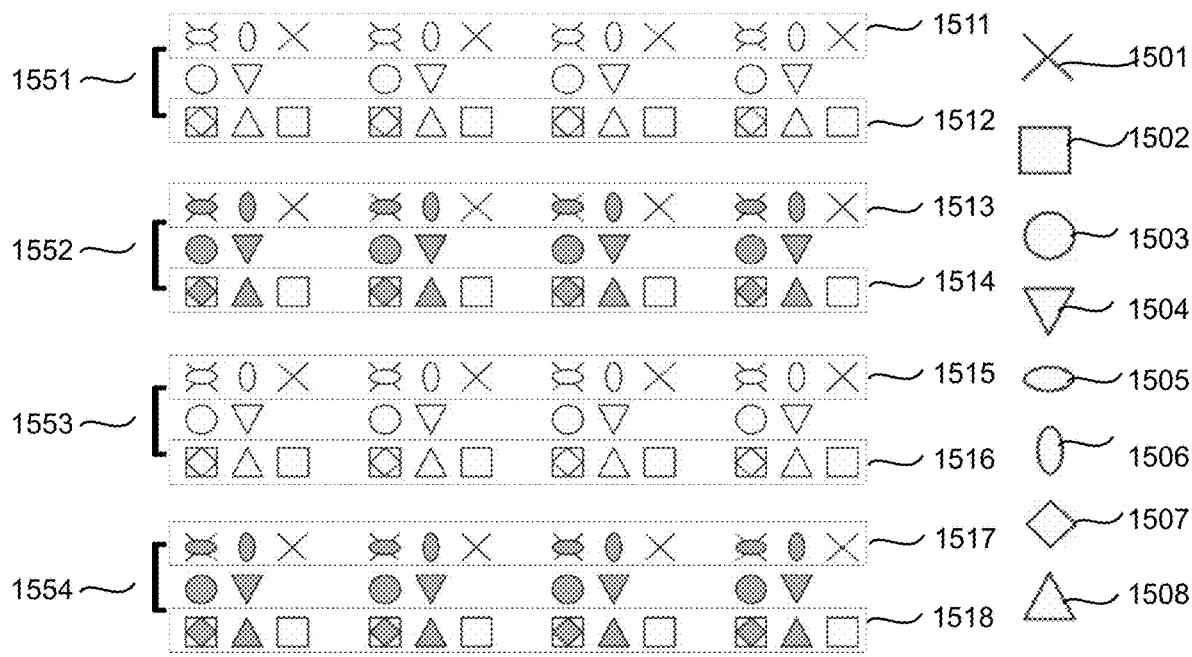
FIG. 15 show exemplary locations of chroma samples relative to luma samples according to embodiments of the disclosure.

Examples of chroma sampling formats are described below. In general, a luma block can correspond to one or more chroma blocks, such as two chroma blocks. A number of samples in each of the chroma block(s) can be less than a number of samples in the luma block. A chroma subsampling format (also referred to as a chroma subsampling format. e.g., specified by chroma_format_idc) can indicate a chroma horizontal subsampling factor (e.g., SubWidthC) and a chroma vertical subsampling factor (e.g., SubHeightC) between each of the chroma block(s) and the corresponding luma block. Chroma subsampling scheme may be specified as 4:x:y formats for a nominal 4 (horizontal) by 4 (vertical) block, with x being the horizontal chroma subsampling factor (the number of chroma samples retained in the first row of the block) and y being how many chroma samples are retained in the second row of the block. In an example, the chroma subsampling format may be 4:2:0, indicating that the chroma horizontal subsampling factor (e.g., SubWidthC) and the chroma vertical subsampling factor (e.g., SubHeightC) are both 2, as shown in FIGS. 15A-15B. In another example, the chroma subsampling format may be

TABLE 3

Syntax changes of CC-ALF

| | |
|---|---|
| if ( slice_cross_component_alf_cb_enabled_flag ) | |
|   alf_ctb_cross_component_cb_idc[ xCtb >> CtbLog2SizeY ][ yCtb >> CtbLog2 SizeY ] | ae(v) |
|   if( slice_cross_component_alf_cb_enabled_flag = = 0 \|\| alf_ctb_cross_componen t_cb_idc[ xCtb >> CtbLog2SizeY ][ yCtb >> CtbLog2SizeY ] = = 0 ) | |
|     if( slice_alf_chroma_idc = = 1 \|\| slice_alf_chroma_idc = = 3 ) { | |
|       alf_ctb_flag[ 1 ][ xCtb >> CtbLog2SizeY ][ yCtb >> CtbLog2SizeY ] | ae(v) |
|       if( alf_ctb_flag[ 1 ][ xCtb >> CtbLog2SizeY ][ yCtb >> CtbLog2SizeY ] && aps_alf_chroma_num_alt_filters_minus1 > 0 ) | |
|       alf_ctb_filter_alt_idx[ 0 ][ xCtb >> CtbLog2SizeY ][ yCtb >> CtbLog2SizeY ] | ae(v) |
|     } | |
| if ( slice_cross_component_alf_cr_enabled_flag ) | |
|   alf_ctb_cross_component_cr_idc[ xCtb >> CtbLog2SizeY ][ yCtb >> CtbLog2 SizeY ] | ae(v) |
|   if( slice_cross_component_alf_cr_enabled_flag = = 0 \|\| alf_ctb_cross_component _cr_idc[ xCtb >> CtbLog2SizeY ][ yCtb >> CtbLog2SizeY ] = = 0 ) | |
|     if( slice_alf_chroma_idc = = 2 \|\| slice_alf_chroma_idc = = 3 ) { | |
|       alf_ctb_flag[ 2 ][ xCtb >> CtbLog2SizeY ][ yCtb >> CtbLog2SizeY ] | ae(v) |
|       if( alf_ctb_flag[ 2 ][ xCtb >> CtbLog2SizeY ][ yCtb >> CtbLog2SizeY ] && aps_alf_chroma_num_alt_filters_minus1 > 0 ) | |
|       alf_ctb_filter_alt_idx[ 1 ][ xCtb >> CtbLog2SizeY ][ yCtb >> CtbLog2SizeY ] | ae(v) |
|     } | |

The semantics of the example CC-ALF related syntaxes above can be described below:

alf_ctb_cross_component_cb_idc[xCtb>>CtbLog2Size Y][yCtb>>CtbLog2Size Y] equal to 0 can indicate that the cross component Cb filter is not applied to a block of Cb color component samples at a luma location (xCtb, yCtb).

alf_ctb_cross_component_cb_idc[xCtb>>CtbLog2Size Y][yCtb>>CtbLog2Size Y] not equal to 0 can indicate that the alf_ctb_cross_component_cb_idc [xCtb>>CtbLog2SizeY][yCtb>>CtbLog2Size Y]-th cross component Cb filter is applied to the block of Cb color component samples at the luma location (xCtb, yCtb).

4:2:2, indicating that the chroma horizontal subsampling factor (e.g., SubWidthC) is 2, and the chroma vertical subsampling factor (e.g., SubHeightC) is 1. In yet another example, the chroma subsampling format may be 4:4:4, indicating that the chroma horizontal subsampling factor (e.g., SubWidthC) and the chroma vertical subsampling factor (e.g., SubHeightC) are 1. As such, a chroma sample format or type (also referred to as a chroma sample position) can indicate a relative position of a chroma sample in the chroma block with respect to at least one corresponding luma sample in the luma block.

FIGS. 15A-15B show exemplary locations of chroma samples relative to luma samples according to embodiments of the disclosure. Referring to FIG. 15A, the luma samples (1501) are located in rows (1511)-(1518). The luma samples (1501) shown in FIG. 15A can represent a portion of a picture. In an example, a luma block (e.g., a luma CB) includes the luma samples (1501). The luma block can correspond to two chroma blocks having the chroma sub-sampling format of 4:2:0. In an example, each chroma block includes chroma samples (1503). Each chroma sample (e.g., the chroma sample (1503)(1)) corresponds to four luma samples (e.g., the luma samples (1501(1))-(1501(4)). In an example, the four luma samples are the top-left sample (1501(1)), the top-right sample (1501(2)), the bottom-left sample (1501(3)), and the bottom-right sample (1501(4)). The chroma sample (e.g., (1503(1))) may be located at a left center position that is between the top-left sample (1501(1)) and the bottom-left sample (1501(3)), and a chroma sample type of the chroma block having the chroma samples (1503) can be referred to as a chroma sample type 0. The chroma sample type 0 indicates a relative position 0 corresponding to the left center position in the middle of the top-left sample (1501(1)) and the bottom-left sample (1501(3)). The four luma samples (e.g., (1501(1))-(1501(4))) can be referred to as neighboring luma samples of the chroma sample (1503)(1).

In an example, each chroma block may include chroma samples (1504). The above description with reference to the chroma samples (1503) can be adapted to the chroma samples (1504), and thus detailed descriptions can be omitted for purposes of brevity. Each of the chroma samples (1504) can be located at a center position of four corresponding luma samples, and a chroma sample type of the chroma block having the chroma samples (1504) can be referred to as a chroma sample type 1. The chroma sample type 1 indicates a relative position 1 corresponding to the center position of the four luma samples (e.g., (1501(1))-(1501(4))). For example, one of the chroma samples (1504) can be located at a center portion of the luma samples (1501(1))-(1501(4)).

In an example, each chroma block includes chroma samples (1505). Each of the chroma samples (1505) can be located at a top left position that is co-located with the top-left sample of the four corresponding luma samples (1501), and a chroma sample type of the chroma block having the chroma samples (1505) can be referred to as a chroma sample type 2. Accordingly, each of the chroma samples (1505) is co-located with the top left sample of the four luma samples (1501) corresponding to the respective chroma sample. The chroma sample type 2 indicates a relative position 2 corresponding to the top left position of the four luma samples (1501). For example, one of the chroma samples (1505) can be located at a top left position of the luma samples (1501(1))-(1501(4)).

In an example, each chroma block includes chroma samples (1506). Each of the chroma samples (1506) can be located at a top center position between a corresponding top-left sample and a corresponding top-right sample, and a chroma sample type of the chroma block having the chroma samples (1506) can be referred to as a chroma sample type 3. The chroma sample type 3 indicates a relative position 3 corresponding to the top center position between the top-left sample and the top-right sample. For example, one of the chroma samples (1506) can be located at a top center position of the luma samples (1501(1))-(1501(4)).

In an example, each chroma block includes chroma samples (1507). Each of the chroma samples (1507) can be located at a bottom left position that is co-located with the bottom-left sample of the four corresponding luma samples (1501), and a chroma sample type of the chroma block having the chroma samples (1507) can be referred to as a chroma sample type 4. Accordingly, each of the chroma samples (1507) is co-located with the bottom left sample of the four luma samples (1501) corresponding to the respective chroma sample. The chroma sample type 4 indicates a relative position 4 corresponding to the bottom left position of the four luma samples (1501). For example, one of the chroma samples (1507) can be located at a bottom left position of the luma samples (1501(1))-(1501(4)).

In an example, each chroma block includes chroma samples (1508). Each of the chroma samples (1508) is located at a bottom center position between the bottom-left sample and the bottom-right sample, and a chroma sample type of the chroma block having the chroma samples (1508) can be referred to as a chroma sample type 5. The chroma sample type 5 indicates a relative position 5 corresponding to the bottom center position between the bottom-left sample and the bottom-right sample of the four luma samples (1501). For example, one of the chroma samples (1508) can be located between the bottom-left sample and the bottom-right sample of the luma samples (1501(1))-(1501(4)).

In general, any suitable chroma sample type can be used for a chroma subsampling format. The chroma sample types 0-5 provide exemplary chroma sample types described with the chroma subsampling format 4:2:0. Additional chroma sample types may be used for the chroma subsampling format 4:2:0. Further, other chroma sample types and/or variations of the chroma sample types 0-5 can be used for other chroma subsampling formats, such as 4:2:2, 4:4:4, or the like. In an example, a chroma sample type combining the chroma samples (1505) and (1507) may be used for the chroma subsampling format 4:2:2.

In another example, the luma block is considered to have alternating rows, such as the rows (1511)-(1512) that include the top two samples (e.g., (1501(1))-(1501)(2))) of the four luma samples (e.g., (1501(1))-(1501) (4))) and the bottom two samples (e.g., (1501(3))-(1501(4))) of the four luma samples (e.g., (1501(1)-(1501(4))), respectively. Accordingly, the rows (1511), (1513), (1515), and (1517) can be referred to as current rows (also referred to as a top field), and the rows (1512), (1514), (1516), and (1518) can be referred to as next rows (also referred to as a bottom field). The four luma samples (e.g., (1501(1))-(1501)(4))) are located at the current row (e.g., (1511)) and the next row (e.g., (1512)). The relative chroma positions 2-3 above are located in the current rows, the relative chroma positions 0-1 above are located between each current row and the respective next row, and the relative chroma positions 4-5 above are located in the next rows.

The chroma samples (1503), (1504), (1505), (1506), (1507), or (1508) are located in rows (1551)-(1554) in each chroma block. Specific locations of the rows (1551)-(1554) can depend on the chroma sample type of the chroma samples. For example, for the chroma samples (1503)-(1504) having the respective chroma sample types 0-1, the row (1551) is located between the rows (1511)-(1512). For the chroma samples (1505)-(1506) having the respective the chroma sample types 2-3, the row (1551) is co-located with the current row (1511). For the chroma samples (1507)-(1508) having the respective the chroma sample types 4-5, the row (1551) is co-located with the next row (1512). The above descriptions can be suitably adapted to the rows (1552)-(1554), and the detailed descriptions are omitted for brevity.

Any suitable scanning method can be used for displaying, storing, and/or transmitting the luma block and the corresponding chroma block(s) described above in FIG. 15A. In some example implementations, progressive scanning may be used.

Alternatively, an interlaced scan may be used, as shown in FIG. 15B. As described above, the chroma subsampling format may be 4:2:0 (e.g., chroma_format_idc is equal to 1). In an example, a variable chroma location type (e.g., ChromaLocType) may indicate the current rows (e.g., ChromaLocType is chroma_sample_loc_type_top_field) or the next rows (e.g., ChromaLocType is chroma_sample_loc_type_bottom_field). The current rows (1511), (1513), (1515), and (1517) and the next rows (1512), (1514), (1516), and (1518) can be scanned separately. For example, the current rows (1511), (1513), (1515), and (1517) can be scanned first followed by the next rows (1512), (1514), (1516), and (1518) being scanned. The current rows can include the luma samples (1501) while the next rows can include the luma samples (1502).

Similarly, the corresponding chroma block can be scanned in an interlaced manner. The rows (1551) and (1553) including the chroma samples (1503), (1504), (1505), (1506), (1507), or (1508) with no fill can be referred to as current rows (or current chroma rows), and the rows (1552) and (1554) including the chroma samples (1503), (1504), (1505), (1506), (1507), or (1508) with gray fill can be referred to as next rows (or next chroma rows). In an example, during the interlaced scan, the rows (1551) and (1553) may be scanned first followed by scanning the rows (1552) and (1554).

Besides ALF described above, a constrained directional enhancement filter (CDEF) may also be used for loop filtering in video coding. An in-loop CDEF may be used to filter out coding artifacts such as quantization ringing artifacts while retaining details of an image. In some coding technologies, a sample adaptive offset (SAO) algorithm may be employed to achieve a similar goal by defining signal offsets for different classes of pixels. Unlike SAO, a CDEF is a non-linear spatial filter. In some examples, the design of the CDEF filter is constrained to be easily vectorizable (e.g., implementable with single instruction, multiple data (SIMD) operations), which was not the case for other non-linear filters such as a median filter and a bilateral filter.

The CDEF design originates from the following observations. In some situations, an amount of ringing artifacts in a coded image can be approximately proportional to a quantization step size. The smallest detail retained in the quantized image is also proportional to the quantization step size. As such, retaining image details would demand smaller quantization step size which would yield higher undesirable quantization ringing artifacts. Fortunately, for a given quantization step size, the amplitude of the ringing artifacts can be less than the amplitude of the details, thereby affording an opportunity for designing a CDEF to strike a balance to filter out the ringing artifacts while maintaining sufficient details.

A CDEF can first identify a direction of each block. The CDEF can then adaptively filter along the identified direction and to a lesser degree along directions rotated 45° from the identified direction. The filter strengths can be signaled explicitly, allowing a high degree of control over blurring of details. An efficient encoder search can be designed for the filter strengths. CDEF can be based on two in-loop filters and the combined filter can be used for video coding. In some example implementations, the CDEF filter(s) may follow deblocking filter(s) for in-loop filtering.

Figure 16:
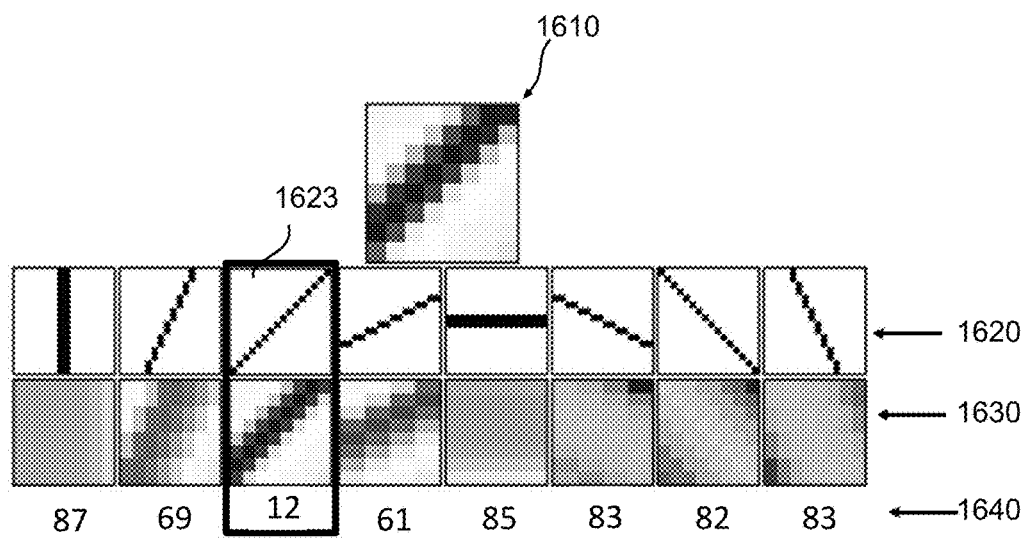
FIG. 16 shows an example of direction search for a block according to an embodiment of the disclosure.

The direction search can operate on reconstructed pixels (or samples), for example, after a deblocking filter, as illustrated in FIG. 16. Since the reconstructed pixels are available to a decoder, the directions may not require signaling. The direction search can operate on blocks having a suitable size (e.g., 8×8 blocks) that are small enough to adequately handle non-straight edges (so that the edges appear sufficient straight in the filtering blocks) and are large enough to reliably estimate directions when applied to a quantized image. Having a constant direction over an 8×8 region can make vectorization of the filter easier. For each block, the direction that best matches a pattern in the block can be determined by minimizing a difference measure, such as a sum of squared differences (SSD), RMS error, and the like, between the quantized block and each of the perfectly directional blocks. In an example, a perfectly directional block (e.g., one of (1620) of FIG. 16) refers to a block where all pixels along a line in one direction have the same value. FIG. 16 shows an example of direction search for an 8×8 block (1610) according to an example embodiment of the disclosure. In an example shown in FIG. 16, the 45-degree direction (1623) among a set of directions (1620) is selected because the 45-degree direction (1623) can minimize the error (1640). For example, the error for the 45-degree direction is 12 and is the smallest among the errors ranging from 12 to 87 indicated by a row (1640).

An example non-linear low-pass directional filter is described in further detail below. Identifying the direction can help align filter taps along the identified direction to reduce ringing artifacts while preserving the directional edges or patterns. However, in some examples, directional filtering alone cannot sufficiently reduce ringing artifacts. It is desired to use additional filter taps on pixels that do not lie along a main direction (e.g., the identified direction). To reduce the risk of blurring, the additional filter taps can be treated more conservatively. Accordingly, a CDEF can define primary taps and secondary taps. In some example implementations, a complete two-dimensional (2-D) CDEF filter may be expressed as $$y(i, j) = x(i, j) + \text{round}\left(\sum_{m,n} w_{d,m,n}^{(p)} f\left(x(m, n) - x(i, j), S^{(p)}, D\right) + \sum_{m,n} w_{d,m,n}^{(s)} f\left(x(m, n) - x(i, j), S^{(s)}, D\right)\right), \quad \text{Eq. (14)}$$

In Eq. (14), D represents a damping parameter, $S^{(p)}$ and $S^{(s)}$ represent the strengths of the primary and secondary taps, respectively, and a function round(•) can round ties away from zero, $w_{d,m,n}^{(p)}$ and $w_{d,m,n}^{(s)}$ represent the filter weights, and $f(d, S, D)$ represents a constraint function operating on a difference d (e.g., d=x(m, n)−x(i, j)) between a filtered pixel (e.g., x(i, j)) and each of the neighboring pixels (e.g., x(m, n)). When the difference is small, $f(d, S, D)$ can be equal to the difference d (e.g., $f(d, S, D)=d$), and thus the filter can behave as a linear filter. When the difference is large, $f(d, S, D)$ can be equal to 0 (e.g., $f(d, S, D)=0$), which effectively ignores the filter tap.

As another in-loop processing component, a set of in-loop restoration schemes may be used in video coding post deblocking to generally de-noise and enhance the quality of edges beyond a deblocking operation. The set of in-loop restoration schemes can be switchable within a frame (or a picture) per suitably sized tile. Some examples of the in-loop restoration schemes are described below based on separable symmetric Wiener filters and dual self-guided filters with subspace projection. Because content statistics can vary substantially within a frame, the filters can be integrated within a switchable framework where different filters can be triggered in different regions of the frame.

An example separable symmetric Wiener filter is described below. The Wiener filter can be used as one of the switchable filters. Every pixel (or sample) in a degraded frame can be reconstructed as a non-causal filtered version of pixels within a w×w window around the pixel, where w=2r+1 and is odd for an integer r. The 2-D filter taps can be denoted by a vector F in a column-vectorized form having $w^2 \times 1$ elements, and a straightforward linear minimum mean square error (LMMSE) optimization may lead to filter parameters given by $F=H^{-1} M$, where H is equal to $E[XX^T]$ and is the auto-covariance of x, the column-vectorized version of the $w^2$ samples in the w×w window around a pixel, and where M is equal to $E[YX^T]$ representing the cross correlation of x with the scalar source sample y to be estimated. The encoder can be configured to estimate H and M from realizations in the deblocked frame and the source, and send the resultant filter F to a decoder. However, in some example implementations, a substantial bitrate cost can occur in transmitting $w^2$ taps. Further, non-separable filtering can make decoding prohibitively complex. Therefore, a plurality of additional constraints may be imposed on the nature of F. For example, F may be constrained to be separable so that the filtering can be implemented as separable horizontal and vertical w-tap convolutions. In an example, each of the horizontal and vertical filters are constrained to be symmetric. Further, in some example implementations, a sum of the horizontal and vertical filter coefficients may be assumed to sum to 1.

Dual self-guided filtering with subspace projection may also be used as one of the switchable filters for in-loop restoration and is described below. In some example implementations, guided filtering can be used in image filtering where a local linear model is used to compute a filtered output y from an unfiltered sample x. The local linear model may be written as $$y = Fx + G \qquad \text{Eq. (15)}$$

where F and G can be determined based on statistics of a degraded image and a guidance image (also referred to as a guide image) in a neighborhood of the filtered pixel. If the guide image is identical to the degraded image, the resultant self-guided filtering can have the effect of edge preserving smoothing. According to some aspects of the disclosure, the specific form of self-guided filtering may depend on two parameters: a radius r and a noise parameter e, and is enumerated as follows:

1. Obtain a mean µ and a variance $\sigma^2$ of pixels in a (2r+1)×(2r+1) window around every pixel. For example, obtaining the mean µ and the variance $\sigma^2$ of the pixels may be implemented efficiently with box filtering based on integral imaging.
2. Compute parameters $f$ and g for every pixel based on Eq. (16)

$$f = \sigma^2/(\sigma^2 + e); g = (1 - f)\mu \qquad \text{Eq. (16)}$$

3. Compute F and G for every pixel as averages of values of the parameters $f$ and g in a 3×3 window around the pixel for use.

The dual self-guided filtering may be controlled by the radius r and the noise parameter e, where a larger radius r can imply a higher spatial variance and a higher noise parameter e can imply a higher range variance.

FIG. 17 shows an example of a subspace projection according to an example embodiment of the disclosure. In the example shown in FIG. 17, the subspace projection may use cheap restorations $X_1$ and $X_2$ to produce a final restoration X closer to a source Y. Even though cheap restorations $X_1$ and $X_2$ are not close to a source Y, appropriate multipliers {α, β} can bring the cheap restorations $X_1$ and $X_2$ much closer to the source Y if the cheap restorations $X_1$ and $X_2$ move in the right direction. For example, the final restoration $X_f$ may be obtained based on Eq. (17) below.

$$X_f = X + \alpha(X_1 - X) + \beta(X_2 - X) \qquad \text{Eq. (17)}$$

Besides the deblocking filter, the ALF, the CDEF, and the loop restoration described above, a loop filtering method referred to as a Cross-Component Sample Offset (CCSO) filter or CCSO, may also be implemented in the loop filtering process to reduce distortion of reconstructed samples (also referred to as reconstruction samples). The CCSO filter may be placed anywhere within the loop filing stage. An example of CCSO filter is shown in FIG. 18 in relation to deblocking, CDEF, and LR filters. In a CCSO filtering process, a non-linear mapping can be used to determine an output offset based on processed input reconstructed samples of a first color component. The output offset can be added to a reconstructed sample of a second color component in a filtering process of CCSO.

The input reconstructed samples can be from the first color component located in a filter support area, as shown in FIG. 19. Specifically, FIG. 19 shows an example of the filter support area in a CCSO filter according to an embodiment of the disclosure. The filter support area can include four reconstructed samples: p0 and p1. The two input reconstructed samples in the example of FIG. 19 are on both sides of a center sample in the vertical direction. In an example, a center sample (denoted by rl) in the first color component (e.g., a luma component) and a sample (denoted by rc) to be filtered in the second color component (e.g., a chroma component) are co-located. When processing the input reconstructed samples, the following steps can be applied:

Step 1: Delta values (e.g., differences) between the four reconstructed samples: p0 and p1 and the center sample rl are computed, and are denoted as m0 and m1, respectively. For example, the delta value between p0 and rl is m0.

Step 2: The delta values m0 to m1 can be further quantized into a number of (e.g., 2) discrete values. The quantized values can be denoted, for example, as d0 and d1 for m0 and m1, respectively. In an example, the quantized value for each of the d0 and d1 may be −1, 0, or 1 based on the following quantization process:

$$di = -1, \text{ if } mi < -N; \quad \text{Eq. (18)}$$

$$di = 0, \text{ if } -N <= mi <= N; \quad \text{Eq. (19)}$$

$$di = 1, \text{ if } mi > N. \quad \text{Eq. (20)}$$

where N is a quantization step size, example values of N are 4, 8, 12, 16, and the like, di and mi refer respectively to quantized value and the delta value where i is 0, 1, 2, or 3.

The quantized values d0 to d3 can be used to identify a combination of the non-linear mapping. In the example shown in FIG. 19, the CCSO filter has two filter inputs d0 to d1, and each filter input can have one of the three quantized values (e.g., −1, 0, and 1), and thus a total number of combinations is 9 (e.g., $3^2$, number of quantized values to the power of number of differences). An example of the 9 combinations with offset values are shown in Table 4 below as a lookup table (LUT).

TABLE 4

Example LUT used in CCSO

| combination index | d0 | d1 | offset |
|---|---|---|---|
| 0 | −1 | −1 | s0 |
| 1 | −1 | 0 | s1 |
| 2 | −1 | 1 | s2 |
| 3 | 0 | −1 | s3 |
| 4 | 0 | 0 | s4 |
| 5 | 0 | 1 | s5 |
| 6 | 1 | −1 | s6 |
| 7 | 1 | 0 | s7 |
| 8 | 1 | 1 | s8 |

The last column can represent the output offset value for each combination, which can be looked up according to the deltas. The output offset values can be integers, such as 0, 1, −1, 3, −3, 5, −5, −7, and the like. The first column represents indices assigned to these combinations of quantized d0 and d1. The middle columns represent all possible combinations of the quantized d0 and d1 (with three possible quantization levels). The offset column may comprise actual offset values. Alternatively, there may be a limited number of allowed offset values, and the offset column in Table 4 may comprises indexes to the allowed offset values. As such, the term offset value and index may be used interchangeably.

The final filtering process of the CCSO filter can be applied as follows:

$$f' = \text{clip}(f + s), \quad \text{Eq. (21)}$$

where $f$ is the reconstructed sample to be filtered, s is the output offset value, for example, retrieved from ta LUT. In an example shown in Eq. (21), the filtered sample value $f'$ of the reconstructed sample to be filtered $f$ can be further clipped into a range associated with a bit-depth.

The example CCSO filtering of reconstructed sample rc in the second color to be filtered corresponding to sample c of the first color with p0 and p1 of the first color, as shown in FIG. 19, may be referred to as a 3-tap CCSO filter design. Alternatively, other CCSO design with different number of filter tabs may be used. For example, another two taps may be added in the horizontal direction to make it a 5-tap filter (4 difference inputs), with the same quantization levels above, the number of delta combinations may be 81 ($3^4$).

FIG. 20 shows an example implementation of various 3-tap CCSO filter shapes according to an embodiment of the disclosure. The term CCSO filter shape is used to represent the number of taps for CCSO filtering and the positions of the taps. A number of filter shapes for a particular number of taps may be predefined as CCSO filter options. For example, in FIG. 20, for 3-tap CCSO filtering, any of the 6 different example filter shapes may be defined. Each of the filter shapes can define positions of the three reconstructed samples (also referred to as three taps) in a first component (also referred to as a first color component). The three reconstructed samples can include a center sample (denoted as c) and two symmetrically located samples, as denoted with same number (one of 1-6) in FIG. 20. In an example, a reconstructed sample in a second color component to be filtered is co-located with the center sample c. For purposes of clarity, the reconstructed sample in the second color component to be filtered is not shown in FIG. 20.

For CCSO filtering, as described above, each CCSO filter corresponds essentially to an LUT. The number of entries (rows) in the LUT is determined by the number of delta and quantization level combinations, as illustrated in Table 4 above. A CCSO filter may be associated with one or more CCSO filter or filtering parameters, including but not limited to filter shape, quantization step size (and quantization levels), and number of bands. The CCSO filter or filtering parameters may be alternatively referred to as CCSO parameters.

In the various implementations herein, a CCSO filtering unit refers to a section of reconstructed video frame of any size that is subject to being processed by a CCSO filter.

As such, the above disclosure provides a CCSO filtering process for a reconstructed sample of a second color component using a reconstructed sample of a first color co-located with the reconstructed sample of the second color and neighboring reconstructed samples of the co-located reconstructed sample of the first color component at the particular CCSO filtering taps. The input to the CCSO filtering process is reconstructed samples of the first color components. The CCSO filtering process generates corresponding offsets to be applied or added to the reconstructed samples of the second color component to output adjusted reconstructed samples of the second color component. In some implementations, the first color component and the second color component may be different. For example, the first color component may be the luma color component and the second color component may be the chroma color component. In some other implementations, such filtering process may also be referred to as cross-component offset filtering even if the first color component and second color component are the same color component. For example, the CCSO process may involve the first color component and second color component both being the luma color component.

As described above, a CCSO filtering is specified by its shape, which includes a number of CCSO filtering taps and the position of the CCSO filtering taps. For example, as shown in FIG. 20, a 3-tap CCSO filter may be used and the three CCSO taps may be at any of the example positions labeled in FIG. 20. The example CCSO filtering scheme of FIG. 20 thus provides 6 different example 3-tap CCSO filters, with each 3-tap CCSO filter corresponding to an LUT for looking up cross-component offset sample offsets. Allowed CCSO filters or filter shapes may be predefined and may be indexed, and a CCSO filter being used may be signaled in the bitstream using, for example its index among the predefined CCSO filters. The LUT corresponding to the allowed CCSO filters may be predefined, or may be adaptively derived. If a CCSO filter is adaptively derived, it would need to be signaled in the bitstream.

In the disclosure above, a CCSO filter is described in the context of integer CCSO filter taps. In other words, the CCSO filtering taps relative to the center tap of the CCSO filter are located at integer sample positions, as shown in FIG. 20. In some further example implementations, the CCSO filtering taps may not need to be located at integer sample positions. In other words, the CCSO filtering tap positions may be at fractional sample positions. A fractional sample position refers to a position with either horizontal or/and vertical pixel coordinate value being a fractional.

Figure 21:
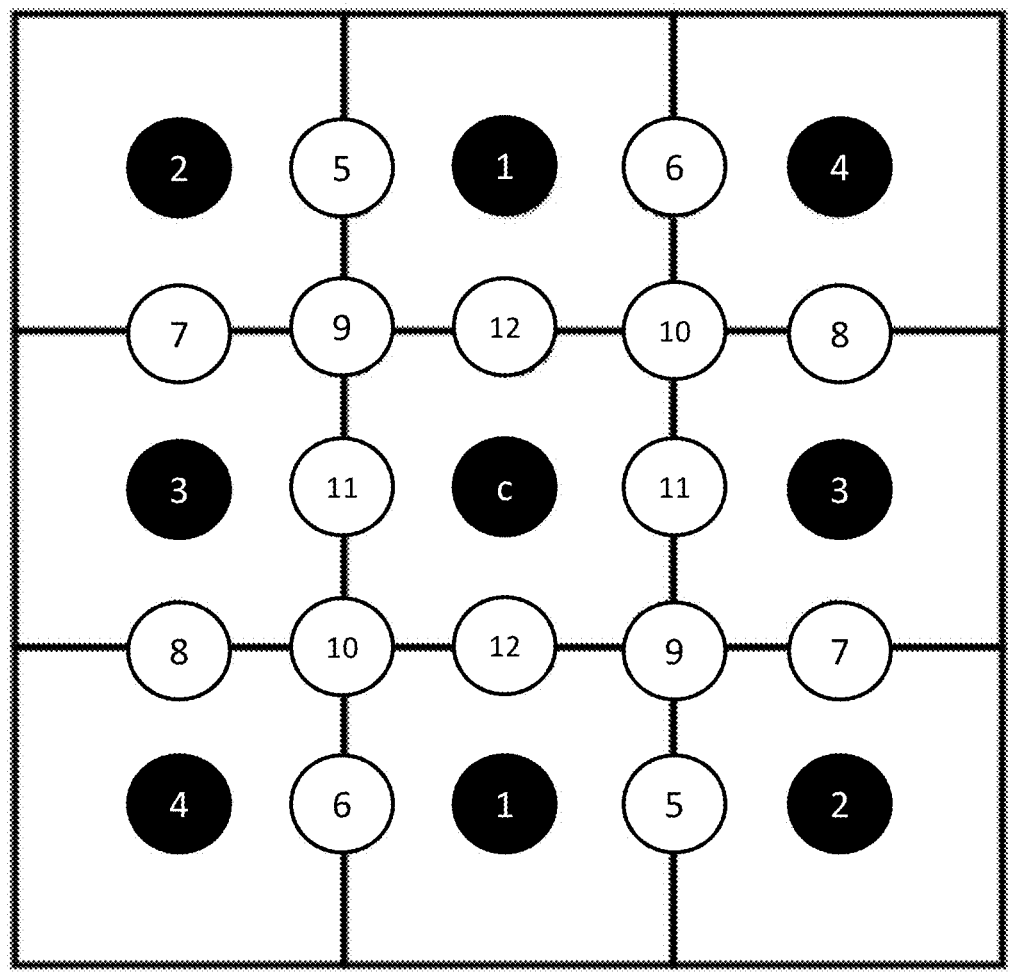
FIG. 21 illustrates example interpolated CCSO filter taps for CCSO filtering.

An example 3-tap CCSO filtering scheme including taps at fractional positions is shown in FIG. 21, where the filled circles refer to integer positions that are used in the cross-component offset filtering scheme above, and the open (unfilled) circles refer to CCSO filter taps located at fractional positions. Each unique numerical label indicates one possible 3-tap CCSO filter. As an example. FIG. 21 illustrates 12 different 3-tap CCSO filters. Each of these 3-tap CCSO filters may be characterized by its horizontal or vertical direction relative to the center tap. The CCSO filters illustrated in FIG. 21 are merely examples, a particular filter tap may be located in other integer or fractional positions and each CCSO filter may include more than 3 CCSO filter taps. A CCSO filter tap position may be fractional only in the horizontal direction, such as the CCSO filter tap positions 5, 6, and 11 in FIG. 21. A CCSO filter tap position may be fractional only in the vertical direction, such as the CCSO filter tap positions 7, 8, and 12 in FIG. 21. A CCSO filter tap position may be fractional in both the horizontal direction and the vertical direction, such as the CCSO filter tap positions 9 and 10 in FIG. 21. Other CCSO filter tap positions in FIG. 21, include positions 1-4, are integer tap positions.

A CCSO tap position as shown FIG. 21 may be defined by a phase and a precision. The precision is used to represent the fractional precision of the tap position. The phase of the tap position is used to indicate which one of the possible fraction positions under a particular precision is selected for the tap. As described in further detail below, the phase and precision for selecting a CCSO filter or CCSO filter shape can be signaled in the bitstream or predefined. A CCSO filter would be defined by the number of CCSO filter taps and their positions (including both the precisions and phases).

In order to apply the CCSO filters with fractional tap positions, input sample values at the corresponding fractional tap positions would need to be determined first. In some example implementations, sample values at these fractional positions may be generated via an interpolation process using reconstructed samples at integer positions. Such an interpolation process may be performed by using an interpolation filter. Once the interpolated samples are generated, the filter taps are applied to interpolated samples located at fractional positions. As such, the CCSO filtering process that allows for fractional tap positions involves an interpolation of the reconstructed samples in the second color component to generate interpolated samples at the fractional tap positions via interpolation filtering, and also a CCSO filtering using the interpolated samples of the second color component to generate sample offset to be applied to the first color component.

In the disclosure herein, the term "CCSO filter tap" or "CCSO filtering tap" is used to refer to the position or location of a CCSO filtering tap of a CCSO filter. Each CCSO filter may be associated with a number of CCSO filtering taps (e.g., 3 taps in 3-tap CCSO filtering). Each of the CCSO filter taps for each CCSO filter may be at an integer pixel position or fractional pixel position as described above. The term "interpolated CCSO filter taps" or "interpolated CCSO filtering taps" or "interpolated filter taps" is used to refer to the values of the CCSO filter or filtering taps that generated after applying the interpolation filter(s) described above and in the further disclosure below. A distinction may be made with respect to the two types of filters disclosed herein: the CCSO filter containing CCSO filter or filtering taps, and the interpolation filter. The interpolation filter is used to generate sample values for CCSO filter taps, particularly fractional taps of the CCSO filter.

In some example implementations, the interpolation above may be performed using a 2-tap interpolation filter (e.g., bilinear filter), a 4-tap interpolation filter, or 6-tap interpolation filter. 8 tap interpolation filter, or an interpolation filters with any other number of interpolation filtering taps. The interpolation filter is applied to the integer samples in the second color component (the input color component to the CCSO filtering). For example, for a 4-tap interpolation, a sample of a fractional position is interpolated by 4 neighboring reconstructed integer samples. The various filtering coefficients in a interpolation filter may depend on the fractional location of the CCSO filtering tap.

In some example implementations, numbers of interpolation filtering taps for the interpolation filter may vary according to a position of the fractional sample to be generated relative to a boundary of a corresponding CCSO filtering unit. For example, a longer filter (e.g., 8-tap) may be applied for internal samples of the CCSO filtering unit, whereas a shorter filter (e.g., 2-tap filter) may be used at the upper and lower boundary of the CCSO filtering unit. Such a scheme may help reduce memory in that it requires less buffering of neighboring CCSO filter units.

In some example implementations, for a fractional CCSO filter tap position with fractional horizontal pixel coordinate but integer vertical pixel coordinate (such as the CCSO filter tap positions 5, 6, and 11 in FIG. 21), a horizontal interpolation filtering with multiple interpolation filter taps may be applied to derive the sample value located at such fractional CCSO filter tap position.

Likewise, in some example implementations, for a fractional CCSO filter tap position with fractional vertical pixel coordinate but integer horizontal pixel coordinate (such as the CCSO filter tap positions 7, 8, and 12 in FIG. 21), a vertical interpolation filtering with multiple interpolation filter taps may be applied to derive the sample value located at such fractional CCSO filter tap position.

Likewise, in some example implementations, for a CCSO filter tap position with both fractional horizontal pixel coordinate and fractional vertical pixel coordinate (such as the CCSO filter tap positions 9 and 10 in FIG. 21), a horizontal (or vertical) interpolation filtering is first applied to reconstructed samples at the integer positions to derive intermediate samples value located at the fractional horizontal (or vertical) filter tap position, and then the sample value located at the filter tap position (both fractional vertical coordinate and fractional horizontal coordinate) is interpolated using the intermediate sample values.

In one particular example implementation, for a CCSO filter tap position with both fractional horizontal pixel coordinate and fractional vertical pixel coordinate (such as the CCSO filter tap positions 9 and 10 in FIG. 21), a weighted average of neighboring four integer reconstructed samples may be used to derive the sample value located at the fractional CCSO filter tap position, as a particular form of interpolation filtering. For example, in FIG. 21, the sample value at the CCSO filter tap position 9 may be derived as a weighted average of sample values at its neighboring integer pixel positions 1, 2, 3, c, or other four neighboring integer positions. The weight coefficients or parameters may depend on or determined based on the relative fractional position of the CCSO filtering tap to the neighboring integer sample positions.

Turing to the CCSO filter tap positions of a CCSO filter, in some example implementations, the phases and/or precisions of the CCSO filter tap positions for the horizontal and/or vertical interpolation process for derivation sample values at the fractional CCSO filtering tap positions may be signaled in the bitstream at the frame level, or any other levels where the cross-component sample offset control parameters are signaled.

For example, several pixel precisions for CCSO filtering tap positions, including but not limited to 1-pel. ½-pel, ¼-pel, ⅛-pel, 1/16-pel, 1/32-pel, may be pre-defined and the selection among these precisions may be signaled in the bitstream at one of various levels.

Further, for each selected precision, a group of allowed phases may be pre-defined and the selection of a phase among these allowed pre-defined phases may be signaled in the bitstream. For example, for the ¼-pel precision, the allowed the phases may be ¼-pel, ½-pel or ¾-pel, and the selection among these phases may be signaled in the bitstream. The signaling may be explicitly included in the bitstream or may be implicitly derived from other information extracted from the bitstream.

In some example implementations, a flag may be first signaled in the bitstream to indicate whether integer or fractional position CCSO filter tap is applied. If the flag (e.g., "is_CCSO_fractional") is signaled with a value indicating that fractional position CCSO filtering taps are not applied, then a integer CCSO filter shape may be determined (either a predetermined CCSO filter shape, or signaled as one of a set of predefined integer CCSO filter shapes, or derived CCSO filter shape according other information in the bitstream). If the flag is signaled with a value indicating that fractional position CCSO filter tap is applied, then another syntax may be further signaled in the bitstream to specify the fractional precision (e.g., ½-pel, ¼-pel, ⅛-pel . . . ). After that, for each precision, another syntax is signaled to indicate the phase (or positions) of the CCSO filter tap. Such two-syntax signaling of precision and phase may help achieve better coding efficiency in that For lower precisions (larger fractional pel values), a smaller number of bits may be needed for the signaling as the bit length for representing the number of possible phases would be smaller than for higher precisions.

In some other example implementations, the phases and/or precisions for the CCSO filtering tap positions may be predefined and hard coded, and as such, no signaling need to be included in the bitstream.

In some example implementations, a set of CCSO filters (each associated with a number of CCSO filtering tap positions, which may be fractional) may be allowed with directions along their filtering tap positions not overlapping between any two allowed CCSO filters.

Figure 22:
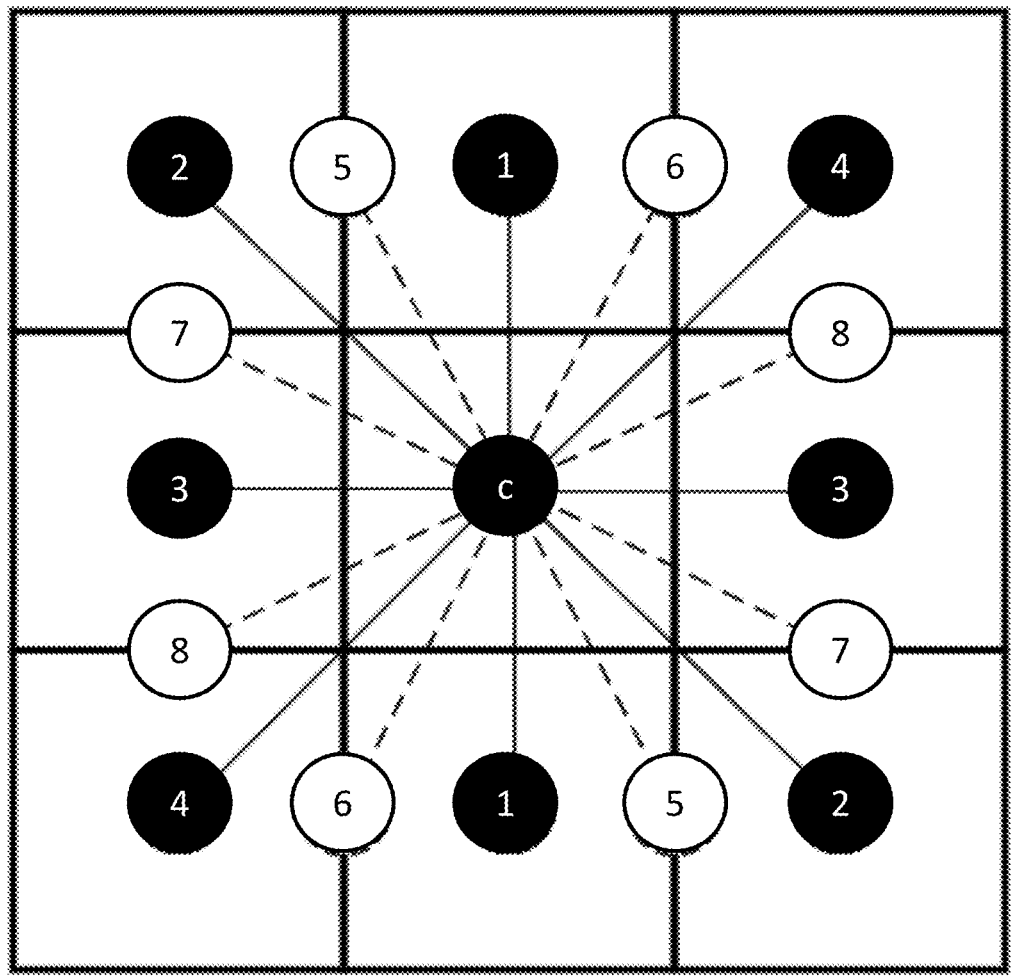
FIG. 22 illustrates examples of allowed ¼-pel and integer-pel interpolated CCSO filter taps for CCSO filtering.

An example is illustrated in FIG. 22, which shows a set of allowed three-tap CCSO filters with ½-pel precision (so that the CCSO filters can have filtering taps at integer positions or ½-pel positions), including 8 example allowed CCSO filters 1, 2, 3, 4, 5, 6, 7, and 8. The lines connecting the taps in these filters do not overlap in direction. Under the constraint that the directions of the lines connecting the filtering taps in each allowed CCSO filters do not overlap, the 3-tap CCSO filters 9 and 2 of FIG. 21 (also having ½-pel precision) would not be both allowed in FIG. 22 because the directions connection their filter taps overlap. The rational may be that those co-directional filter taps do not provide significant difference to CCSO filtering performance and thus they need not be two different options among other CCSO filter options for the encoder to select during coding process, and only including one as a CCSO filter option also help reducing total number of CCSO filter options and thus the number of bits in signaling the selection CCSO filter in the bitstream.

In some example implementations, the interpolated CCSO filter taps may be only applicable to the loop filtering of selected color components. For example, the interpolated CCSO filter taps may be only applicable for loop filtering the luma color components. In other words, the interpolated CCSO filter can only be applied to luma samples to generate CCSO sample offset. Specifically, the interpolated CCSO filter taps may be only applicable for the cross-component loop filtering using luma components as input and the output sample offsets are applied on chroma samples. For other situations, no fractional CCSO filtering taps requiring interpolation may be allowed.

In some example implementations, whether interpolated CCSO filter taps can be applied to a specific color component for sample offset generation may be signaled in high-level syntax, including but not limited to sequence header, frame header, slice header, tile header, largest coding block header.

In some example implementations, the number (or position) of fractional CCSO filter taps may be different for different color components as to either input of the CCSO filtering or where the generated sample offsets are applied. In other words, the CCSO filtering process of different input color components for generating sample offset may select different CCSO filters which may have different number of fractional CCSO filtering taps. Similarly, the CCSO filtering process to generate sample offset for different color components may select different CCSO filters which may have different number of fractional CCSO filtering taps for applying sample offsets to different color components.

In some example implementations, the interpolated CCSO filter taps may be only applicable to given fractional precisions. For example, the interpolated CCSO filter taps may be only available for ½-pel position. For another example, the interpolated CCSO filter taps may be only available for ½-pel and ¼-pel positions.

In some example implementations, the selection of the interpolated CCSO filter taps may be derived by the neighboring samples of the current block. As such, the selection my not need to be signaled in the bitstream, and a decoder may determine the taps In some example implementations, the selection of the interpolated filter tap may be signaled in a pre-defined level where the said cross-component sample offset is applied, for example, the frame level, or slice level.

In some example implementations, a first flag may be signaled to indicate whether integer or fractional filter taps are being used. After that, if the first flag is signaled to indicate that integer filter taps are being applied, then a second index is signaled to indicate which integer filter taps are being applied. Otherwise, if the second flag is signaled to indicate that fractional filter taps are being applied, then a third index is signaled to indicate which fractional filter taps are being applied. In such implementations, possible integer CCSO filters and possible fractional CCSO filters may be grouped and indexed separately for selection by the encoder for CCSO filtering and for signaling of the selected CCSO filter, either integer or fractional in the bitstream. Such two-group signaling scheme may be more efficient in signaling bit-length when the number of possible integer CCSO filters and the number of possible fractional CCSO filters are disparate.

In some other example implementations, all the candidate CCSO filters, and the CCSO filter tap positions (regardless integer or fractional) may be pooled together, and an index for the selected CCSO filter in one index space may be signaled in the to indicate which CCSO filter (hence which CCSO taps) is being applied.

Figure 23:
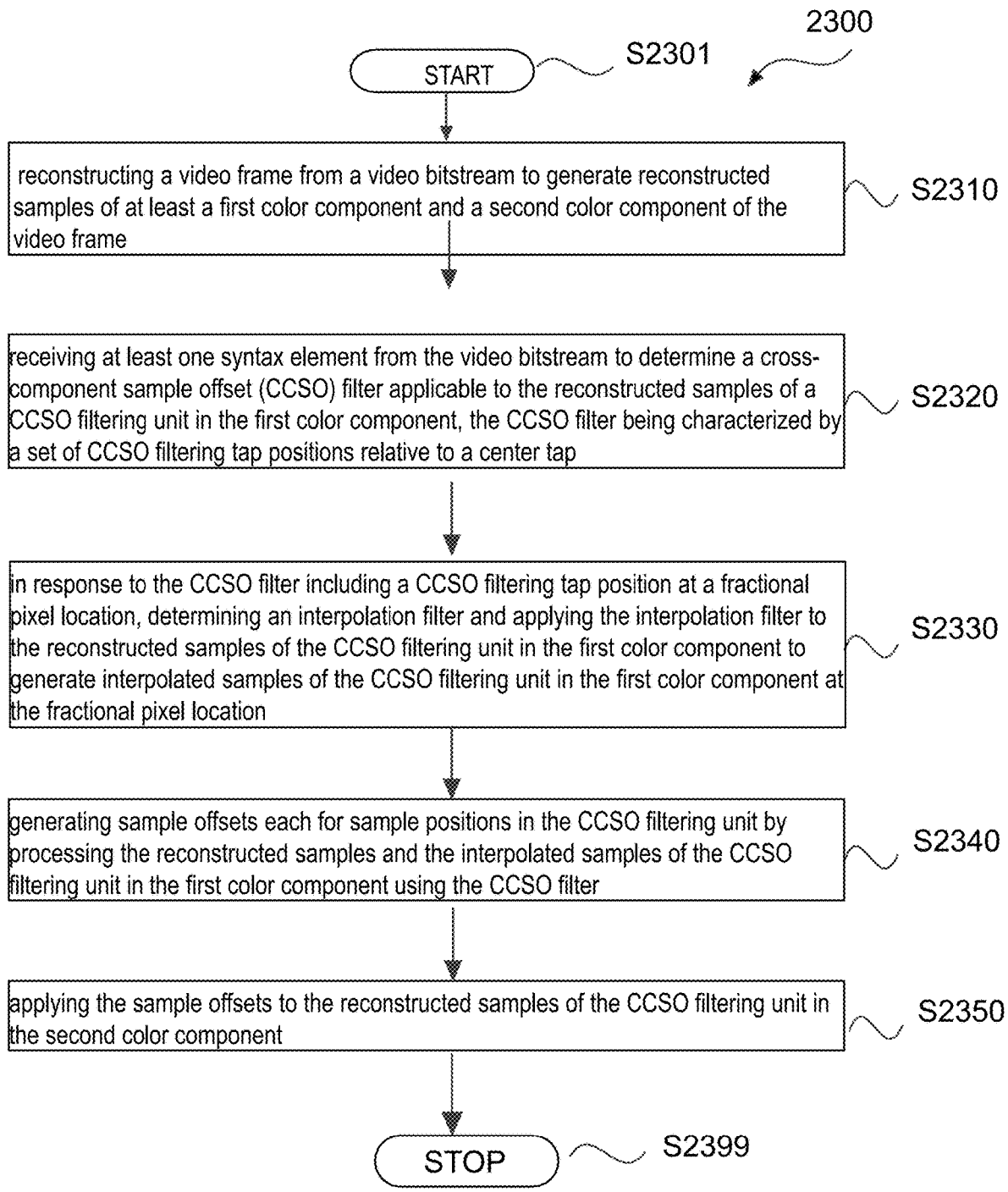
FIG. 23 shows a flow chart outlining a process (2300) according to an embodiment of the disclosure.

FIG. 23 shows a flow chart 2300. The logic flow 2300 start at S2301. At S2310, a video frame from a video bitstream is reconstructed to generate reconstructed samples of at least a first color component and a second color component of the video frame. In S2320, at least one syntax element is received from the video bitstream to determine a cross-component sample offset (CCSO) filter applicable to the reconstructed samples of a CCSO filtering unit in the first color component, the CCSO filter being characterized by a set of CCSO filtering tap positions relative to a center tap. At S2330, in response to the CCSO filter including a CCSO filtering tap position at a fractional pixel location, an interpolation filter is determined and applied to the reconstructed samples of the CCSO filtering unit in the first color component to generate interpolated samples of the CCSO filtering unit in the first color component at the fractional pixel location. In S2340, sample offsets each for sample positions in the CCSO filtering unit are generated by processing the reconstructed samples and the interpolated samples of the CCSO filtering unit in the first color component using the CCSO filter. In S2350, the sample offsets are applied to the reconstructed samples of the CCSO filtering unit in the second color component. The logic flow 2300 ends at S2399.

Operations above may be combined or arranged in any amount or order, as desired. Two or more of the steps and/or operations may be performed in parallel. Embodiments and implementations in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block. The term block may be interpreted as a prediction block, a coding block, or a coding unit. i.e. CU. The term block here may also be used to refer to the transform block. In the following items, when saying block size, it may refer to either the block width or height, or maximum value of width and height, or minimum of width and height, or area size (width*height), or aspect ratio (width:height, or height:width) of the block.

The techniques described above, can be implemented as computer software using computer-readable instructions and physically stored in one or more computer-readable media. For example, FIG. 24 shows a computer system (2400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 24:
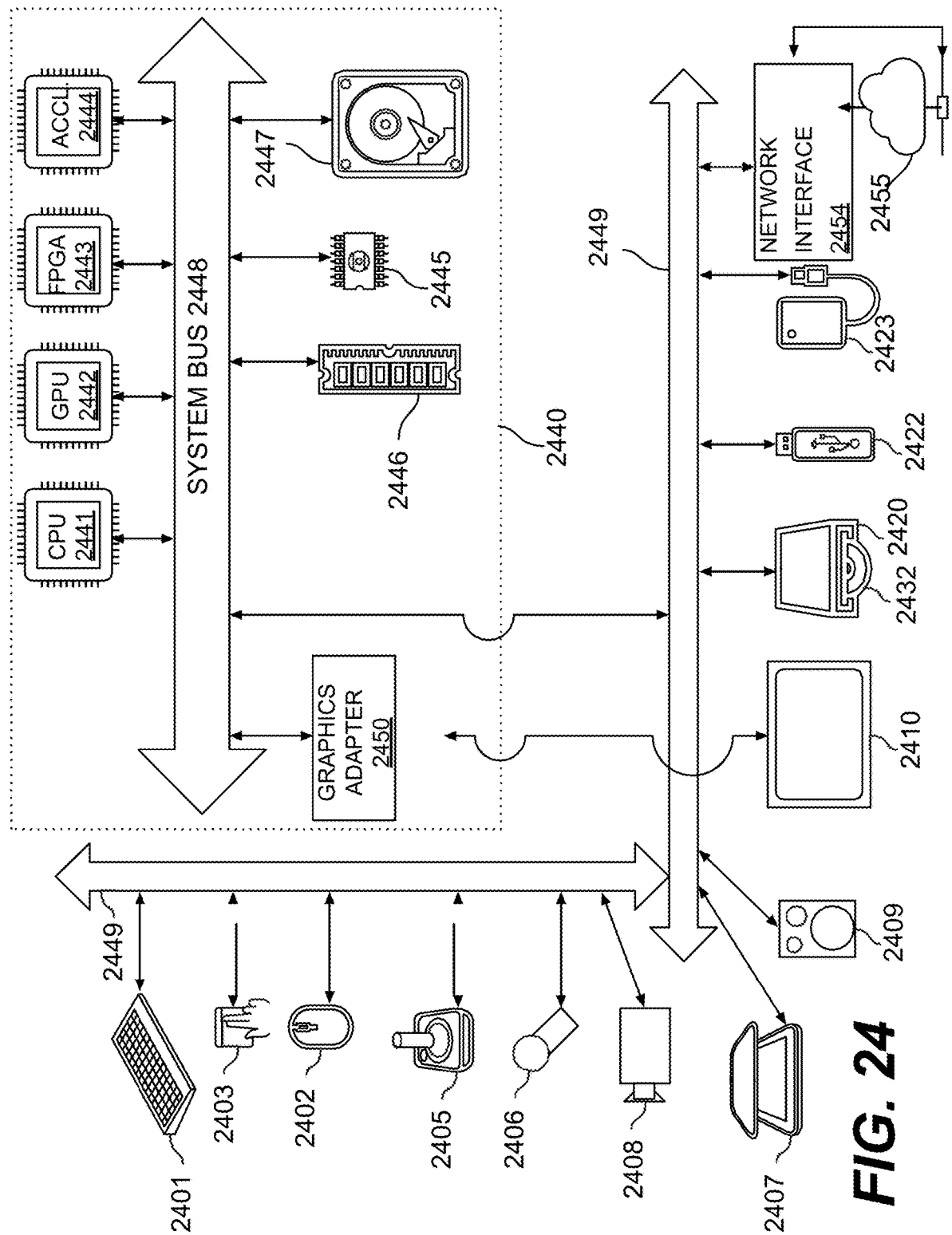
FIG. 24 shows a schematic illustration of a computer system in accordance with an example embodiment.

The components shown in FIG. 24 for computer system (2400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2400).

Computer system (2400) may include certain human interface input devices. Input human interface devices may include one or more of (only one of each depicted): keyboard (2401), mouse (2402), trackpad (2403), touch screen (2410), data-glove (not shown), joystick (2405), microphone (2406), scanner (2407), camera (2408).

Computer system (2400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2410), data-glove (not shown), or joystick (2405), but there can also be tactile feedback devices that do not serve as input devices), audio output devices (such as: speakers (2409), headphones (not depicted)), visual output devices (such as screens (2410) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (2400) can also include human accessible storage devices and their associated media such as optical media including CD/DVD ROM/RW (2420) with CD/DVD or the like media (2421), thumb-drive (2422), removable hard drive or solid state drive (2423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2400) can also include an interface (2454) to one or more communication networks (2455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like. TV wireline or wireless wide area digital networks to include cable TV, satellite TV, and terrestrial broadcast TV, vehicular and industrial to include CAN bus, and so forth.

Aforementioned human interface devices, human-accessible storage devices, and network interfaces can be attached to a core (2440) of the computer system (2400).

The core (2440) can include one or more Central Processing Units (CPU) (2441), Graphics Processing Units (GPU) (2442), specialized programmable processing units in the form of Field Programmable Gate Areas (FPGA) (2443), hardware accelerators for certain tasks (2444), graphics adapters (2450), and so forth. These devices, along with Read-only memory (ROM) (2445), Random-access memory (2446), internal mass storage such as internal non-user accessible hard drives, SSDs, and the like (2447), may be connected through a system bus (2448). In some computer systems, the system bus (2448) can be accessible in the form of one or more physical plugs to enable extensions by additional CPUs, GPU, and the like. The peripheral devices can be attached either directly to the core's system bus (2448), or through a peripheral bus (2449). In an example, the screen (2410) can be connected to the graphics adapter (2450). Architectures for a peripheral bus include PCI, USB, and the like.

The computer readable media can have computer code thereon for performing various computer-implemented operations. The media and computer code can be those specially designed and constructed for the purposes of the present disclosure, or they can be of the kind well known and available to those having skill in the computer software arts.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method comprising:
   reconstructing a video frame from a video bitstream to generate reconstructed samples of at least a first color component and a second color component of the video frame;
   receiving at least one syntax element from the video bitstream to determine a cross-component sample offset (CCSO) filter applicable to the reconstructed samples of a CCSO filtering unit in the first color component, the CCSO filter being characterized by a set of CCSO filtering tap positions relative to a center tap;
   in response to the CCSO filter including a CCSO filtering tap position at a fractional pixel location, determining an interpolation filter and applying the interpolation filter to the reconstructed samples of the CCSO filtering unit in the first color component to generate interpolated samples of the CCSO filtering unit in the first color component at the fractional pixel location;
   generating sample offsets each for sample positions in the CCSO filtering unit by processing the reconstructed samples and the interpolated samples of the CCSO filtering unit in the first color component using the CCSO filter; and
   applying the sample offsets to the reconstructed samples of the CCSO filtering unit in the second color component.

2. The method of claim 1, wherein the at least one syntax element comprises an indication of the CCSO filtering tap position at the fractional pixel location.

3. The method of claim 2, wherein the interpolation filter is configured to perform a multi-tap interpolation.

4. The method of claim 3, wherein the interpolation filter comprises a 2-tap, 4-tap, 6-tap, or 8-tap interpolation filter.

5. The method of claim 3, wherein a number of taps in the interpolation filter for the multi-tap interpolation depends on a relative location of the reconstructed samples in the CCSO filtering unit to a boundary of the CCSO filtering unit.

6. The method of claim 3, wherein the interpolation filter is configured to perform:
   the multi-tap interpolation in a horizontal direction only when the CCSO filter comprises fractional tap positions only in the horizontal direction;
   the multi-tap interpolation in a vertical direction only when the CCSO filter comprises fractional tap positions only in the vertical direction; or
   the multi-tap interpolation by interpolating in one of a vertical direction and a horizontal direction to generate intermediate interpolation samples followed by interpolating the intermediate interpolation samples in another of the vertical direction and the horizontal direction, when the CCSO filter comprises fractional tap positions in both the horizontal direction and the vertical direction.

7. The method of claim 2, wherein the indication of the CCSO filtering tap position at the fractional pixel location comprises a first signaling syntax element and a second signaling syntax element for indicating a CCSO fractional pixel precision and a phase in the CCSO fractional pixel precision, respectively, for determining the CCSO filtering tap position at the fractional pixel location.

8. The method of claim 7, wherein the first signaling syntax element comprises an index for indicating one of a set of predetermined CCSO fractional pixel precisions, the set of predetermined CCSO fractional pixel precisions comprise at least one of ½-pel precision, ¼-pel precision, ⅛-pel precision, ¹⁄₁₆-pel precision, ¹⁄₃₂ precision.

9. The method of claim 7, wherein the second signaling syntax element comprises a phase index among a group of predefined phases determined according to the CCSO fractional pixel precision indicated by the first signaling syntax element.

10. The method of claim 7, wherein the at least one syntax element further comprises a flag preceding the first signaling syntax element and the second signaling syntax element for indicating that the CCSO filter comprises by one or more fractional tap positions.

11. The method of claim 1, wherein the CCSO filter as indicated by the at least one syntax element is selected from a plurality of allowed CCSO filters, and the plurality of allowed CCSO filters do not overlap in tab directions.

12. The method of claim 1, wherein the interpolation filter is only applied to one or more selected color components.

13. The method of claim 12, wherein the one or more selected color components are predetermined.

14. The method of claim 13, wherein the one or more selected color components consist of luma color component.

15. The method of claim 14, wherein the second color component comprises one of chroma components.

16. The method of claim 1, wherein the fractional pixel location comprises a specific predefined fractional pixel location.

17. The method of claim 1, wherein the set of CCSO filtering tap positions are implicitly derived using neighboring samples of a current block.

18. The method of claim 1, wherein the at least one syntax element is configured to signal a selection from CCSO filters having fractional tap positions or CCSO filters having only integer tap positions using separate index spaces.

19. The method of claim 1, wherein the at least one syntax element is configured to signal a selection from CCSO filters having fractional tap positions or CCSO filters having only integer tap positions using a single index space.

20. A device comprising a memory for storing instructions and a processor for executing the instructions to:
- reconstruct a video frame from a video bitstream to generate reconstructed samples of at least a first color component and a second color component of the video frame;
- receive at least one syntax element from the video bitstream to determine a cross-component sample offset (CCSO) filter applicable to the reconstructed samples of a CCSO filtering unit in the first color component, the CCSO filter being characterized by a set of CCSO filtering tap positions relative to a center tap;
- in response to the CCSO filter including a CCSO filtering tap position at a fractional pixel location, determine an interpolation filter and applying the interpolation filter to the reconstructed samples of the CCSO filtering unit in the first color component to generate interpolated samples of the CCSO filtering unit in the first color component at the fractional pixel location;
- generate sample offsets each for sample positions in the CCSO filtering unit by processing the reconstructed samples and the interpolated samples of the CCSO filtering unit in the first color component using the CCSO filter; and
- apply the sample offsets to the reconstructed samples of the CCSO filtering unit in the second color component.

\* \* \* \* \*